US009851564B2

(12) United States Patent
Riccomini et al.

(10) Patent No.: US 9,851,564 B2
(45) Date of Patent: Dec. 26, 2017

(54) HEAD-MOUNTED DISPLAY DEVICE WITH PROTECTIVE VISOR

(71) Applicant: Microsoft Technology Licensing, LLC, Redmond, WA (US)

(72) Inventors: Roy Riccomini, Saratoga, CA (US); Philip Frank, Portland, OR (US); Errol Mark Tazbaz, Bellevue, WA (US); Andriy Pletenetskyy, Mountain View, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/688,980

(22) Filed: Apr. 16, 2015

(65) Prior Publication Data

US 2016/0209655 A1   Jul. 21, 2016

Related U.S. Application Data

(60) Provisional application No. 62/105,676, filed on Jan. 20, 2015.

(51) Int. Cl.
*G02B 27/01* (2006.01)

(52) U.S. Cl.
CPC ....... *G02B 27/0172* (2013.01); *G02B 27/017* (2013.01); *G02B 27/0176* (2013.01)

(58) Field of Classification Search
USPC ................................................. 359/630–637
See application file for complete search history.

(56) References Cited

U.S. PATENT DOCUMENTS

| 5,546,099 | A  | 8/1996  | Quint et al. |
| 6,157,291 | A  | 12/2000 | Kuenster et al. |
| 6,369,952 | B1 | 4/2002  | Rallison et al. |
| 8,335,040 | B2 | 12/2012 | Mukawa et al. |

(Continued)

FOREIGN PATENT DOCUMENTS

| CA | 2354114 A1 | 1/2002 |
| EP | 0691559 A1 | 1/1996 |

(Continued)

OTHER PUBLICATIONS

"An HMD in a SKI Mask ?", Published on: Apr. 16, 2011, Available at: http://cb.nowan.net/blog/2011/04/16/an-hmd-in-a-ski-mask/.

(Continued)

*Primary Examiner* — Darryl J Collins
*Assistant Examiner* — Journey Sumlar
(74) *Attorney, Agent, or Firm* — Arent Fox LLP

(57) ABSTRACT

A head-mounted display device includes a head fitting by which the display device can be worn on the head of a user, and a visor assembly mounted to the head fitting. The visor assembly includes a plurality of display elements arranged to be aligned with the eyes of the user, a plurality of sensors, and a protective enclosure that encloses the display elements and the sensors. The protective enclosure may include an upper portion aligned with the sensors and a lower portion aligned with the display elements. The upper portion may be substantially opaque to visible light and transparent to infrared light. The lower portion may have a variable tinting scheme in which at least some of the lower portion of the enclosure is transparent to visible light.

18 Claims, 25 Drawing Sheets

(56) References Cited

U.S. PATENT DOCUMENTS

| | | |
|---|---|---|
| 8,605,008 B1 | 12/2013 | Prest et al. |
| 2002/0089469 A1 | 7/2002 | Cone et al. |
| 2009/0040296 A1 | 2/2009 | Moscato |
| 2009/0180194 A1 | 7/2009 | Yamaguchi et al. |
| 2009/0322861 A1* | 12/2009 | Karpf ................ G02B 26/026 348/53 |
| 2010/0079356 A1 | 4/2010 | Hoellwarth |
| 2012/0069445 A1 | 3/2012 | Kobayashi |
| 2012/0180204 A1* | 7/2012 | Hawkins ............ A42B 3/226 2/424 |
| 2013/0194389 A1 | 8/2013 | Vaught et al. |
| 2013/0222235 A1 | 8/2013 | Abdollahi et al. |
| 2013/0318776 A1 | 12/2013 | Jacobs et al. |
| 2013/0321925 A1 | 12/2013 | Jacobs et al. |
| 2014/0192084 A1 | 7/2014 | Latta et al. |
| 2014/0211322 A1 | 7/2014 | Bohn et al. |
| 2014/0253605 A1* | 9/2014 | Border ............ G02B 27/0172 345/690 |
| 2014/0266987 A1 | 9/2014 | Magyari |

FOREIGN PATENT DOCUMENTS

| | | |
|---|---|---|
| EP | 2105781 A1 | 9/2009 |
| JP | H10293265 A | 11/1998 |
| JP | 2006126590 A | 5/2006 |
| WO | 9725646 A1 | 7/1997 |
| WO | 9966490 A1 | 12/1999 |
| WO | 2008096719 A1 | 8/2008 |

OTHER PUBLICATIONS

"Laster Technologies Mask G1", Published on: Mar. 5, 2014, Available at: http://www.inition.co.uk/opinion/laster-technologies-mask-g1/.

"Vuzix and NS Solutions Roll Out World's First Optical Transmission Type HMD Glasses With AR Technology", Published on: Feb. 28, 2011, Available at: http://newlaunches.com/archives/vuzix_and_ns_solutions_roll_out_worlds_first_optical_transmission_type_hmd_glasses_with_ar_technology.php.

"International Search Report and Written Opinion Issued in PCT Application No. PCT/US2016/013126", dated Mar. 23, 2016, 12 Pages.

Non-Final Office Action dated May 9, 2016, for U.S. Appl. No. 14/668,958 of Riccomini, R. et al. filed Apr. 16, 2015.

U.S. Appl. No. 14/688,958 of Riccomini, R. et al. filed Apr. 16, 2015.

International Search Report & Written Opinion Issued in PCT Application No. PCT/US2016/012010, dated Jun. 15, 2016, 13 Pages.

Final Office Action dated Nov. 1, 2016, for U.S. Appl. No. 14/688,958 of Riccomini, R. et al. filed Apr. 16, 2015.

"Second Written Opinion Issued in PCT Application No. PCT/US2016/012010", dated Jan. 10, 2017, 8 Pages.

International Preliminary Report on Patentability Issued in PCT Application No. PCT/US2016/012010, dated Apr. 10, 2017, 09 Pages.

Notice of Allowance dated May 16, 2017, for U.S. Appl. No. 14/688,958, of Riccomini, R. et al. filed Apr. 16, 2015.

\* cited by examiner

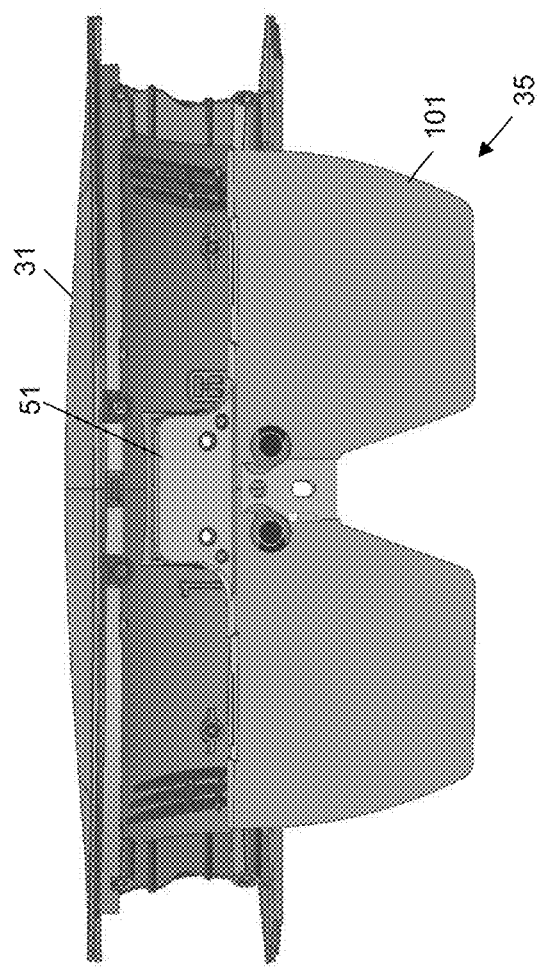
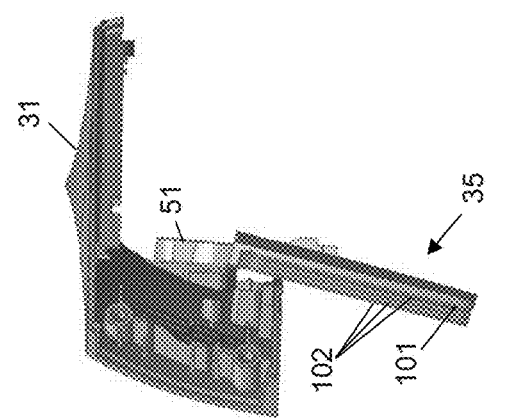
FIG. 16B
FIG. 16A

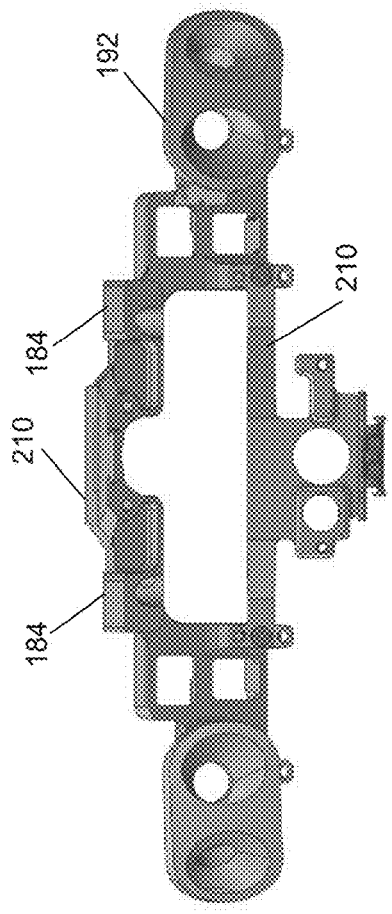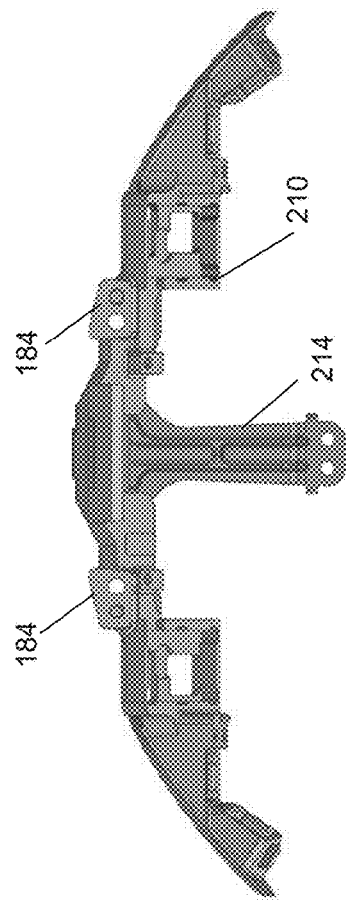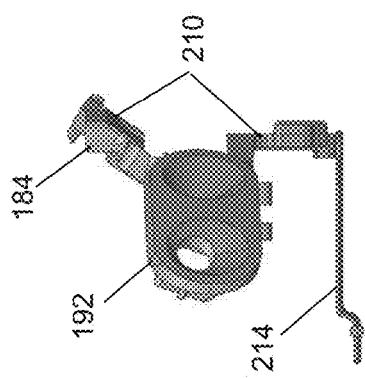

HEAD-MOUNTED DISPLAY DEVICE WITH PROTECTIVE VISOR

This application claims the benefit of U.S. provisional patent application No. 62/105,676, filed on Jan. 20, 2015, which is incorporated herein by reference.

BACKGROUND

Augmented Reality (AR) HMD devices ("AR-HMD" devices) include transparent display elements that enable a user to see concurrently both the real world around them and AR content displayed by the device. An AR-HMD device may include sensitive components, such as light-emission elements, waveguides, and various types of sensors. These components may require very precise positioning and alignment within the device in order to function properly. Even minor mechanical or thermal stresses applied to these components can potentially affect the positioning or alignment of such components and thereby adversely affect functionality of the device. Additionally, these components may be vulnerable to damage due to being dropped or other impacts, normal handling, or environmental factors.

SUMMARY

Introduced here is a display device that has a head fitting by which the display device can be worn on the head of a user, and a visor assembly mounted to the head fitting. In certain embodiments, the visor assembly includes a plurality of display elements arranged to be aligned with the eyes of the user, a plurality of sensors, and a protective enclosure that encloses the display elements and the sensors. The protective enclosure may include an upper portion aligned with the sensors and a lower portion aligned with the display elements. The upper portion may be substantially opaque to visible light and transparent to infrared light. The lower portion may have a variable tinting scheme in which at least some of the lower portion of the enclosure is transparent to visible light.

Other aspects of the technology will be apparent from the accompanying figures and detailed description.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

One or more embodiments of the present disclosure are illustrated by way of example and not limitation in the figures of the accompanying drawings, in which like references indicate similar elements.

FIGS. 16A and 16B shows right side and front orthogonal views, respectively, of the optics assembly mounted to the chassis.

FIGS. 20A, 20B and 20C show, respectively, the right side, front and bottom orthogonal views of the sensor frame and anti-reflection shields.

DETAILED DESCRIPTION

In this description, references to "an embodiment", "one embodiment" or the like, mean that the particular feature, function, structure or characteristic being described is included in at least one embodiment of the technique introduced here. Occurrences of such phrases in this specification do not necessarily all refer to the same embodiment. On the other hand, the embodiments referred to also are not necessarily mutually exclusive.

Figure 1:
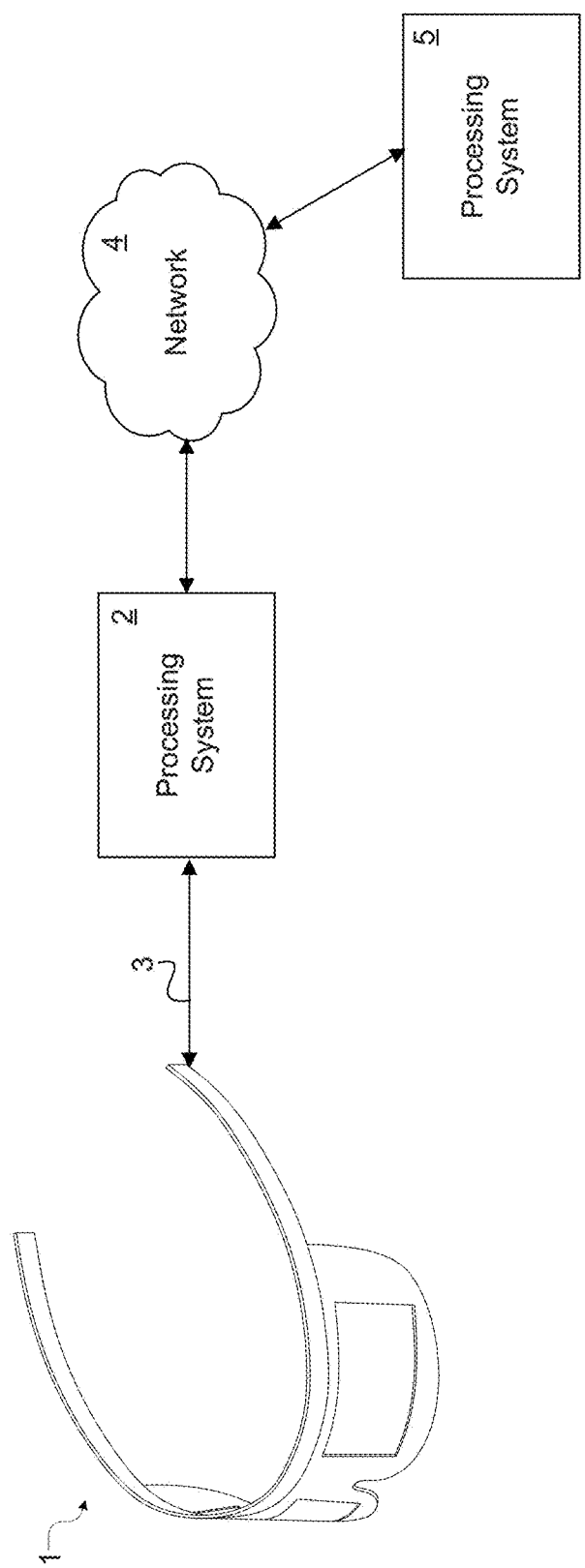
FIG. 1 shows an example of an environment in which an AR-HMD device can be used.

FIG. 1 schematically shows an example of an environment in which an AR-HMD device such as described herein can be used. In the illustrated example, the AR-HMD device 1 is configured to communicate data to and from an external processing device 2 through a connection 3, which can be a wired connection, a wireless connection, or a combination thereof. In other use cases, however, the AR-HMD device 1 may operate as a standalone device. The connection 3 can be configured to carry any kind of data, such as image data (e.g., still images and/or full-motion video, including 2D and 3D images), audio, multimedia, voice, and/or any other type(s) of data. The processing system 2 may be, for example, a game console, personal computer, tablet computer, smartphone, or other type of processing device. The connection 3 can be, for example, a universal serial bus (USB) connection, Wi-Fi connection, Bluetooth or Bluetooth Low Energy (BLE) connection, Ethernet connection, cable connection, DSL connection, cellular connection (e.g., 3G, LTE/4G or 5G), or the like, or a combination thereof. Additionally, the processing system 2 may communicate with one or more other processing systems via a network 4, which may be or include, for example, a local area network (LAN), a wide area network (WAN), an intranet, a metropolitan area network (MAN), the global Internet, or a combination thereof.

Figure 2A:
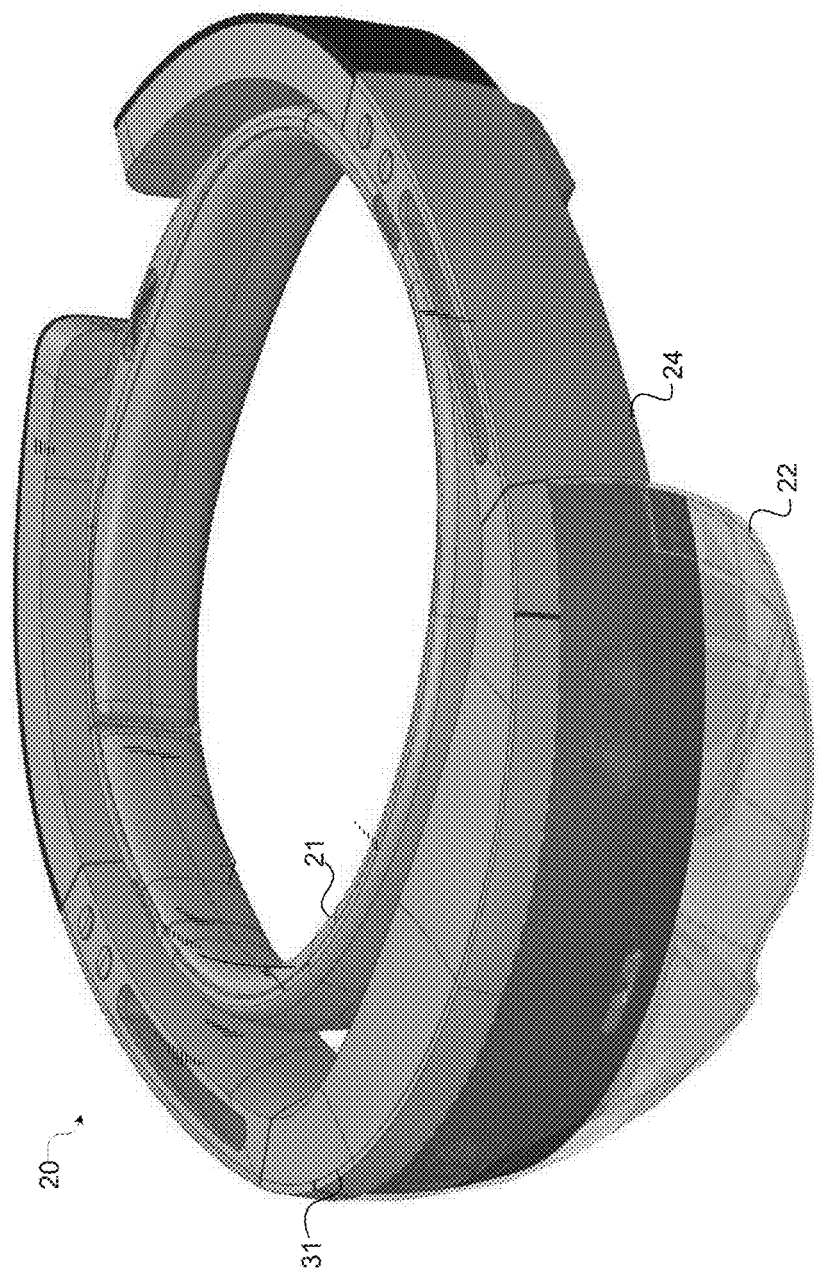
FIG. 2A is a perspective view of an example of an AR-HMD device.
Figure 2B:
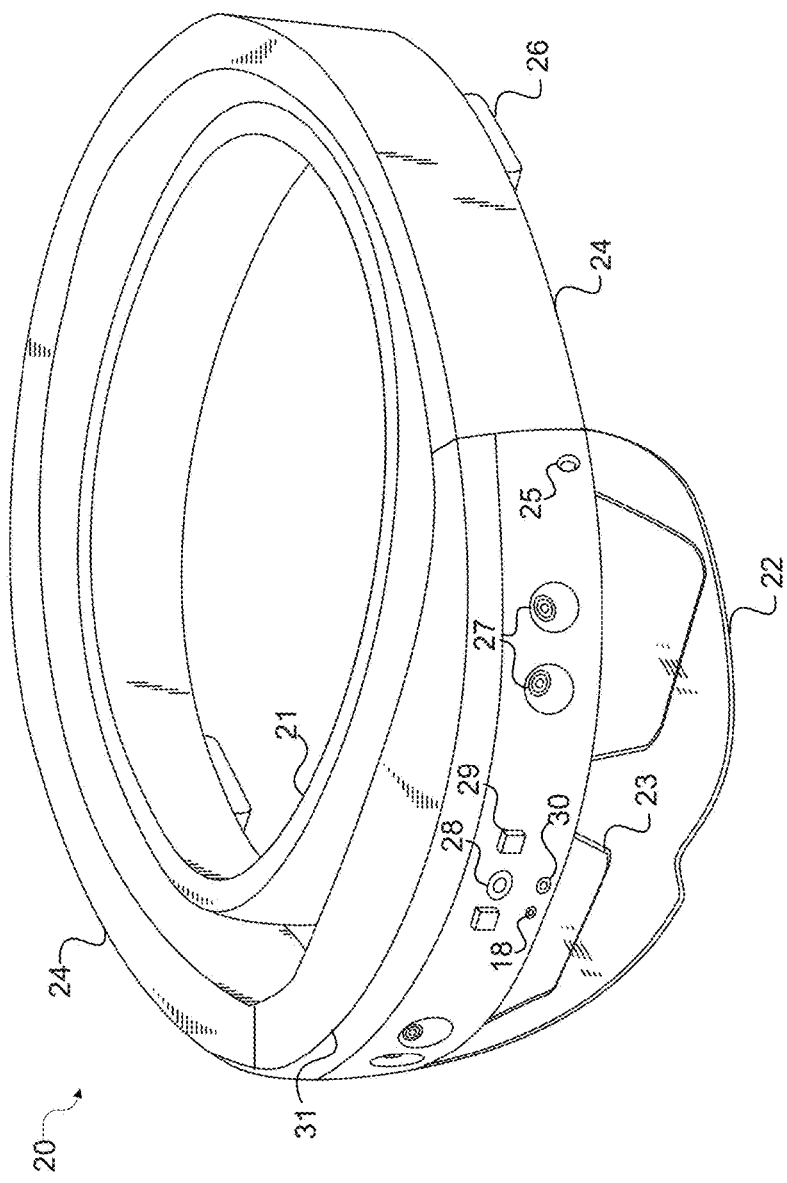
FIG. 2B schematically illustrates the AR-HMD device of FIG. 2A.

FIGS. 2A and 2B show a perspective views of an illustrative AR-HMD device 20 (hereinafter simply "HMD device" or "device" 20) that can incorporate the features being introduced here, according to one embodiment. Specifically, FIG. 2A shows a realistic view of the HMD device 20, while FIG. 2B shows a schematic view of the HMD device 20 including various ones of its components. The HMD device 20 can be an embodiment of AR-HMD device 1 in FIG. 1.

In certain embodiments, the display components, sensors and processing electronics of the HMD device 20 are mounted on a chassis 31, as described in detail below. The chassis 31 is part of a protective sealed visor assembly 22 that contains the sensors, electronics, and display components, including left and right AR displays 23. The AR displays 23 are designed to overlay images on the user's view of his real-world environment, e.g., by projecting light into the user's eyes. Left and right side arms 24 are structures that attach to the chassis 31 at the left and right open ends of the chassis 31, respectively, via a flexible or rigid fastening mechanisms (including one or more clamps, hinges, etc.). The HMD device 20 includes an adjustable headband (or other type of head fitting) 21, attached to the side arms 24, by which the AR-HMD device 20 can be worn on a user's head.

In certain embodiments, the visor assembly 22 encloses an ambient light sensor (ALS) 18, one or more microphones 25 to input speech from the user (e.g., for use in recognizing voice commands and providing audio effects); one or more visible-spectrum head-tracking tracking cameras 27 for use in capturing images of surrounding surfaces to allow tracking of the user's head position and orientation in real-world space; one or more infrared (IR) spectrum depth cameras 28 for use in determining distances to nearby surfaces (e.g., for use in surface reconstruction to model the user's environment); one or more IR illumination sources 29 for use with the depth camera(s) 28; one or more visible spectrum video cameras 30 for use in capturing standard video of what the user sees. Note that the term "visible" in the context of this description means visible to a typical human being. The visor assembly 22 may also enclose electronic circuitry (not shown in FIG. 2) to control at least some of the aforementioned elements and to perform associated data processing functions. The circuitry may include, for example, one or more processors and one or more memories. The HMD device 20 also includes one or more audio speakers 26 to output sound to the user. Note that in other embodiments the aforementioned components may be located in different locations on the AR-HMD device 20. Additionally, some embodiments may omit some of the aforementioned components and/or may include additional components not mentioned above.

The visor assembly 22 provides the user with relatively unobstructed and transparent vision of the user's surrounding real world environment, while also providing physical protection of the sensitive display components and sensors from damage due to handling, impact, and environmental factors. The visor assembly 22 is further illustrated in FIGS. 3 and 4. In certain embodiments the visor assembly 22 includes the chassis 31, various display elements, sensors and electronics, and a protective shield enclosure 37. The shield enclosure 37, which includes a rear shield 32 and a front shield 33, protects the sensitive display elements, sensors and electronics from damage or misalignment due to ordinary handling and impacts. The display elements are suspended within the visor assembly 22 such that in the event of a drop, the display elements and shield enclosure 37 do not collide when there is minor deflection of the shield enclosure 37. The visor assembly 22 protects the sensitive optics, sensors and electronics during cleaning and wearing of the HMD device 20. It prevents the user's face, eyes, nose, etc., from touching the optics assembly by encapsulating them with durable transparent material molded into an ergonomically correct form. The shield enclosure 37 can include an add-on or molded-in nose pad. It can also incorporate some degree of optical diopter curvature (prescription) from, for example, the molding process. The shield enclosure 37 can incorporate tinted, mirrored, anti-reflective and/or other coatings, colors and/or finishes. The shield enclosure 37 can include features such as snaps, bosses, screws, and other types of fasteners, to attach it to a chassis. The shield enclosure 37 can be made of a single part or multiple parts, including clear parts, opaque parts, or a combination thereof.

In certain embodiments, the shield enclosure 37 can be a molded transparent component that is attached to the chassis 31 of the HMD device 20 to provide protection for the optics assembly from the environment and the user. In this disclosure, the term "rear" generally refers to a part or surface that is closest to the user (wearer) of the HMD, while the term "front" generally refers to a corresponding part or surface that is farthest from the user. The optics and sensors are mounted to the chassis 31 (as described further below) and suspended within the shield enclosure so that the sensitive (display) surfaces of the optics do not touch the shields or any other part.

The shield enclosure 37 can incorporate at least a portion (e.g., one half) of an amount of optical correction provided by the HMD, where the remainder of the optical correction can be incorporated into the display assembly (e.g., AR displays 23). The optical correction used to focus holographic images about 2 meters in front of the user's eyes, for visual comfort. In certain embodiments, this optical correction can be built partially into the rear shield as a negative curvature and partially into the front surface of the optics assembly as a positive curvature. Distributing the optical correction between two or more parts in this manner helps to reduce the thickness and weight of the optics assembly.

Figure 3:
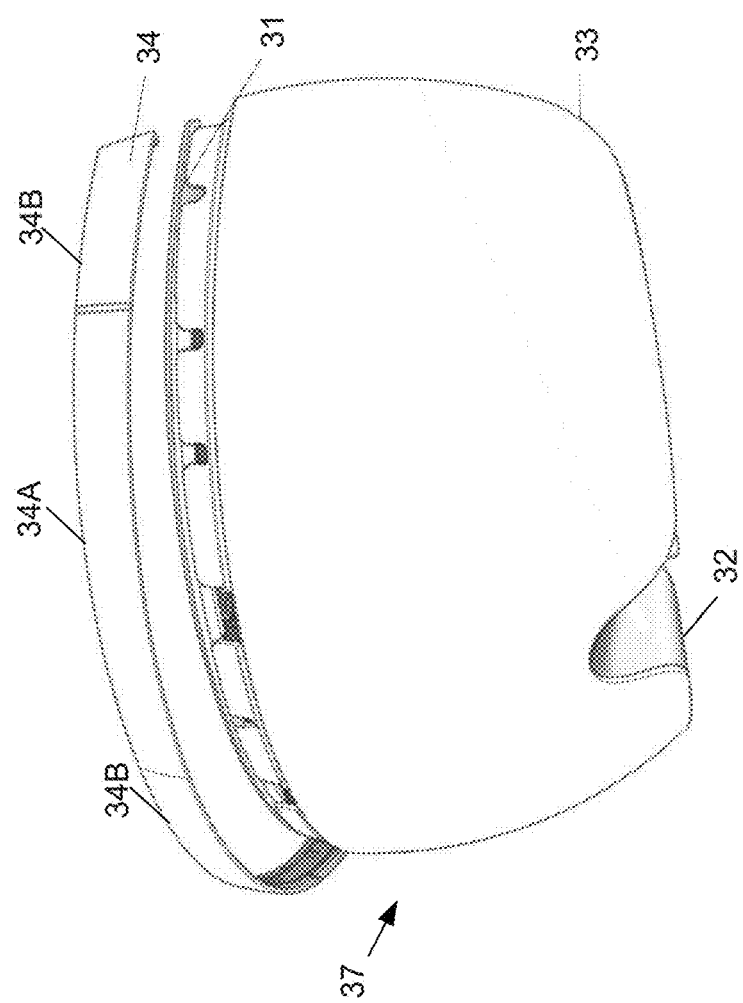
FIG. 3 shows a front perspective view of the visor assembly according to an embodiment.
Figure 8B:
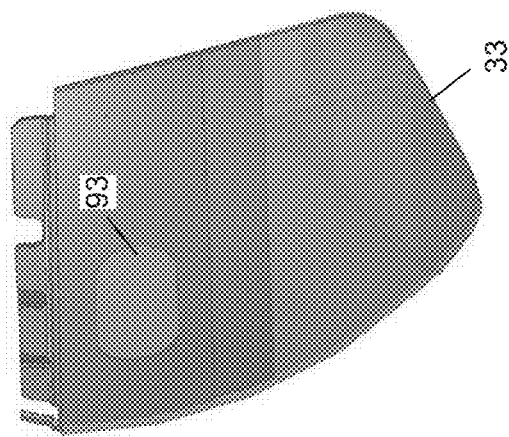
FIGS. 8A and 8B show front and left side orthogonal views, respectively, of the front shield of the shield enclosure.
Figure 8A:
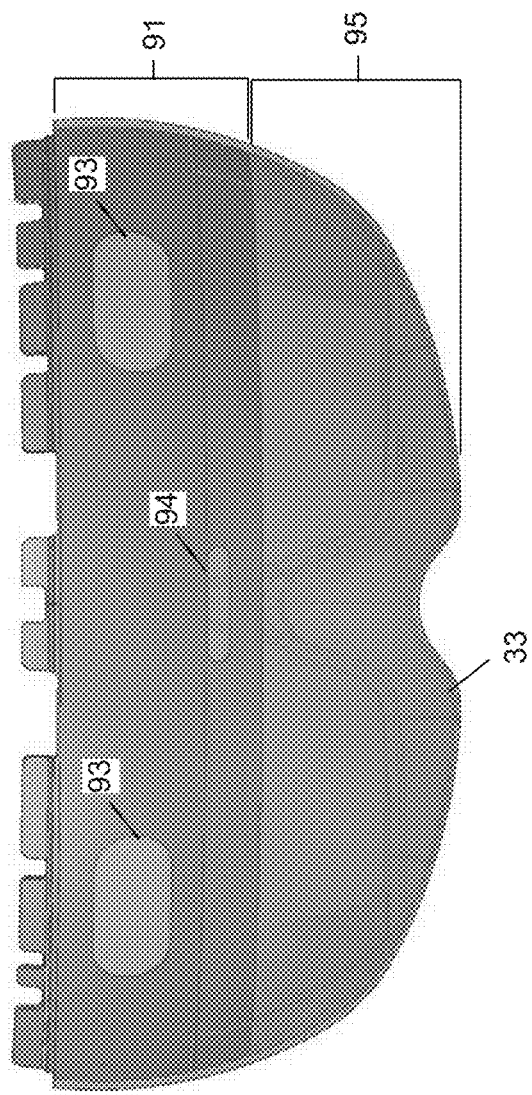
Figure 9:
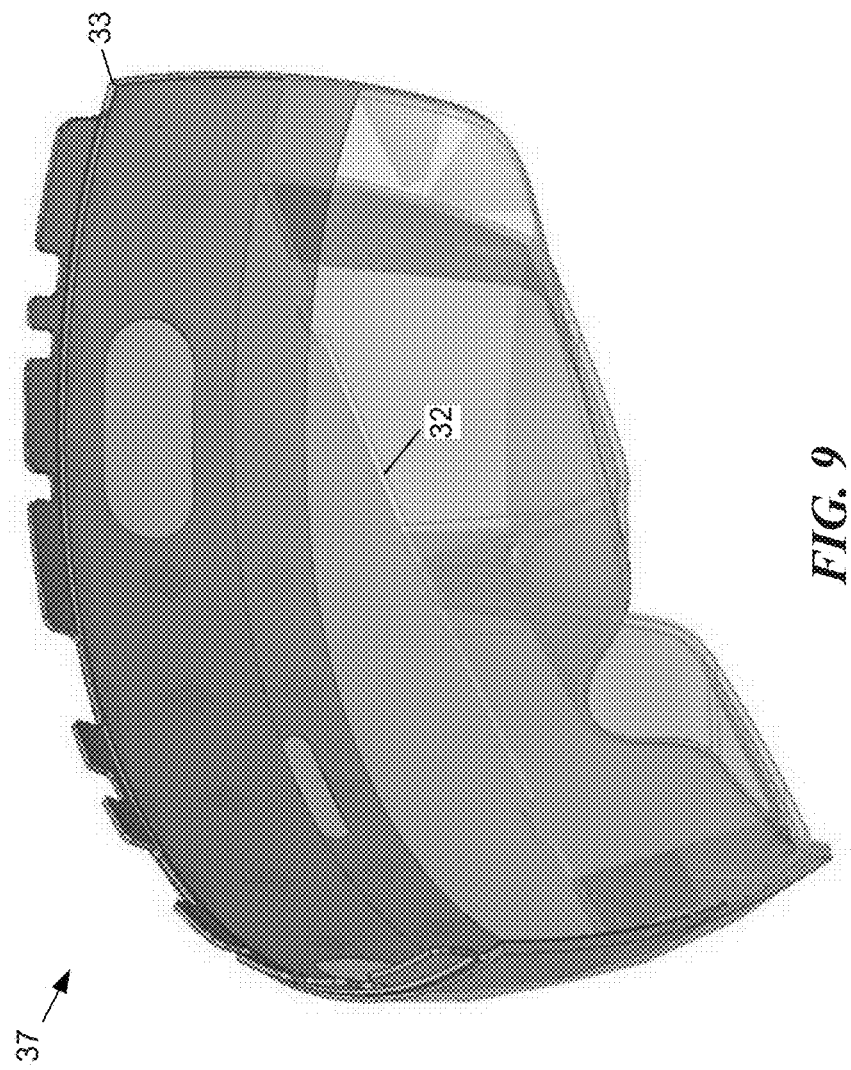
FIG. 9 shows a rear perspective view of the shield enclosure.

The visor assembly 22 is now further described in reference to FIGS. 3 through 9. FIG. 3 shows a front perspective view and FIG. 9 shows a rear perspective view of the visor assembly 22, according to an embodiment. In the illustrated embodiment, the shield enclosure 37 includes the rear shield 32, front shield 33, and shield cover 34 (the shield cover 34 is shown detached in FIG. 3, which is a partial exploded view). The front shield 33 and rear shield 32 are at least partially transparent to visible light. In some embodiments, a tinted coating is applied to at least the front shield 33, along with a protective coating. The back of the shield cover 34 may contain small protrusions, or "teeth," that fit into corresponding grooves at the top of the front shield 33, to allow the shield cover to lock into place.

Note that in some embodiments, side strips 34B of the shield cover 34 (located on either side of the center strip 34A) may be or may contain antennas usable by the HMD for wireless communication, such as for WiFi and/or Bluetooth based communication.

Figure 4B:
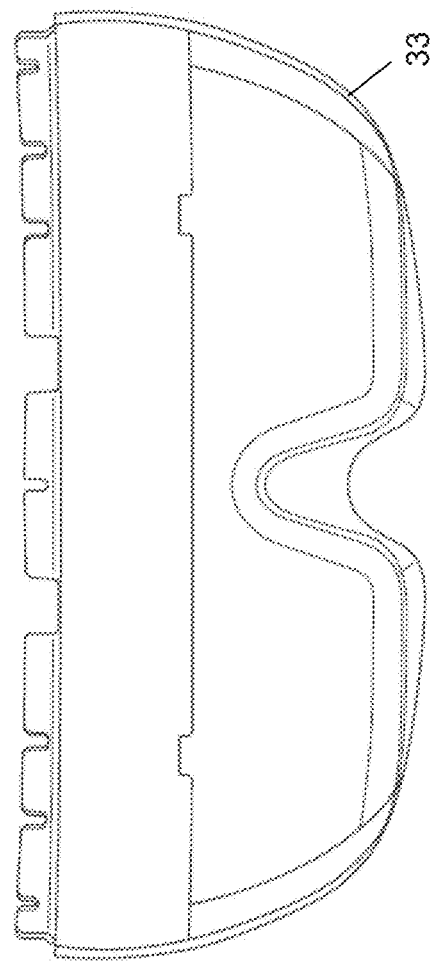
FIGS. 4A and 4B show right side and front views, respectively, of the front shield.
Figure 4A:
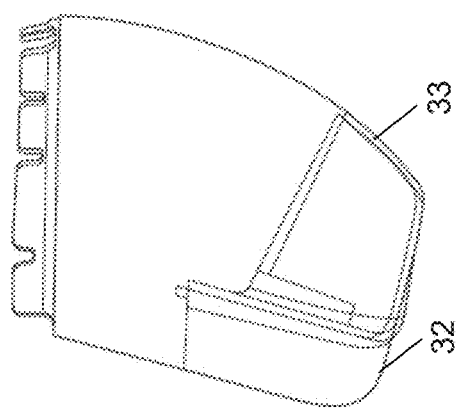
Figure 5:
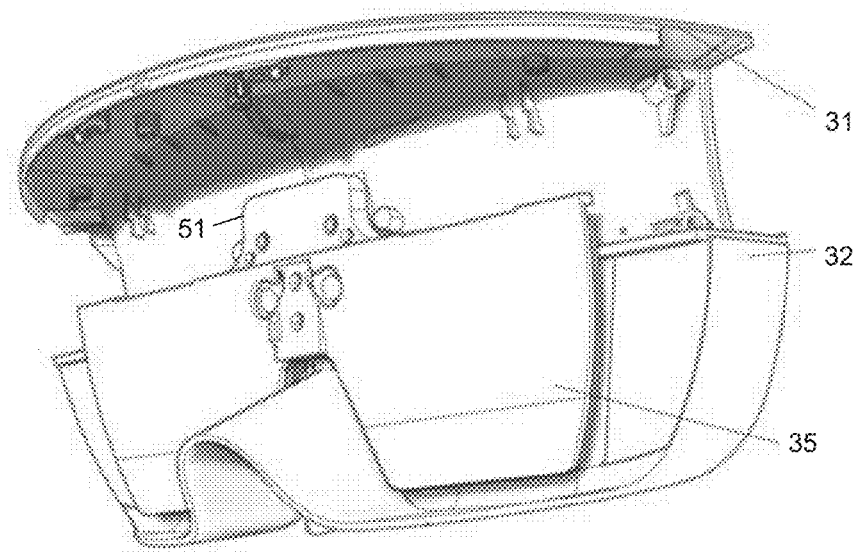
FIG. 5 shows a front perspective view of the visor, with the front shield removed.

FIGS. 4A and 4B show right side and front views, respectively, of the front shield 33. FIG. 5 shows a front perspective view, with the front shield removed, illustrating how the optics assembly 35 can be mounted to a chassis 31 and suspended within the shield enclosure. The chassis 31 can be attached, directly or indirectly, to the headband side arms 24 other similar structure(s) (FIG. 2). The side arms 24 or other similar structure can be inserted into the left and right open ends of the chassis 31 and attached to a surface of the chassis 31 (e.g., via screws, clamps and/or other types of fasteners), as discussed further below.

As shown in FIG. 5, the chassis 31 is positioned above and in contact with the rear shield 32 and front shield 33 of the shield enclosure 37. The chassis 31 serves as a mounting base to which the optics assembly 35, light-emission elements (not shown in FIG. 5) and certain sensors (not shown in FIG. 5) are mounted. The optics assembly 35 includes multiple optical waveguides mounted on a transparent optical waveguide carrier, as described further below. The optics assembly 35 can be attached to the chassis 31 by one or more screws (or other types of fasteners) through a center tab 51 located over the nose bridge region of the optics assembly 35. In the illustrated embodiment, the optics assembly 35 is mounted to the chassis 31 only through its central nose bridge region, which decouples most mechanical and thermal stresses from the optics assembly and thereby helps prevent damage or performance degradation due to deflection and warping of the optics.

Figure 6:
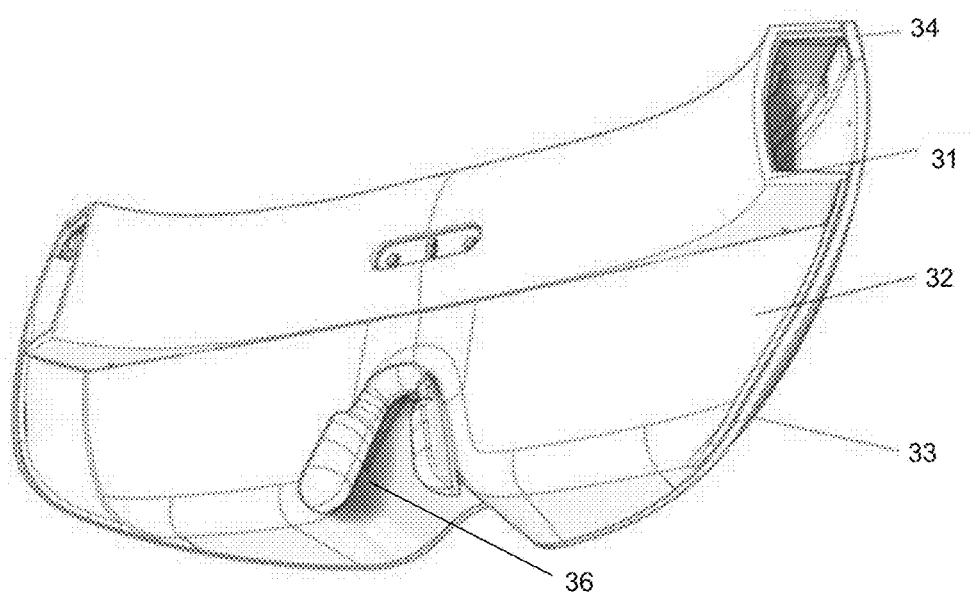
FIG. 6 shows a rear perspective view of the visor.
Figure 7:
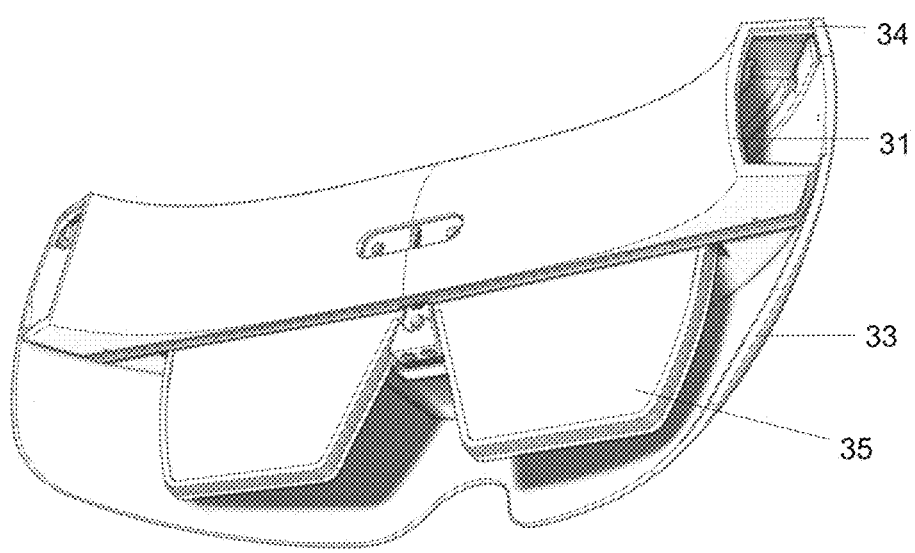
FIG. 7 shows a rear perspective view of the visor without the rear shield.

FIG. 6 shows a rear perspective view of the visor assembly 22, providing an additional view of the rear shield 32 and rear surface of the chassis 31. The shield enclosure 37 includes a nose pad 36, which may be initially formed as a separate piece and then bonded to the shield enclosure 37, or which may be formed as an integral part of the rear shield 32 and/or front shield 33. As mentioned above, the front or rear surface of the rear shield 32 may provide at least a portion of the overall optical correction used to focus holographic images about 2 meters in front of user. FIG. 7 shows a rear perspective view of the visor without the rear shield.

In certain embodiments, at least the exterior surfaces of the rear shield 32 and front shield 33 of the shield enclosure 37 are coated with one or more layers of coating to provide, for example, tint, anti-reflectiveness, oleophobicity, scratch resistance, etc. In certain embodiments, the upper portion 91 of the exterior front shield 33 is uniformly coated with a tinting that is substantially opaque to visible light but transparent to IR light. FIGS. 8A and 8B show, respectively, front and left side orthogonal views of the front shield 33 of the shield enclosure 37, illustrating an example of the tinting scheme. The opaque tinting on the upper portion 91 hides most of the sensor assembly from view, to improve the visual aesthetics of the HMD 20, while still allowing the IR depth camera 28 and IR illumination sources 29 to serve their intended purpose. However, the upper portion 91 of the front shield 22 also has small regions ("windows") 93 and 94 that are devoid of tinting, or that have substantially less tinting, so as to transmit visible light, located over the visible spectrum head-tracking cameras 27 and visible-spectrum video camera 30 (not shown in FIG. 8). In the final assembly of the HMD 20, Windows 93 are located over the head tracking cameras 27, and window 94 is located over the ALS 18 and visible-spectrum video camera 30. The lower portion 95 is preferably tinted but still transparent to visible light. Note that the term "transparent" in this context should be understood to encompass any of various degrees of transparency and does not imply 100% transparency, unless so stated. The tinting on the lower portion 95 may be uniform, or it may have a variable (e.g., graded along a vertical axis) tinting. In some embodiments, the tinting on the lower portion 95 varies from about 90% opaque to visible light at the border of the upper portion to about 10% opaque to visible light at the bottom of the front shield 33.

FIG. 9 shows a rear perspective view of the shield enclosure 37. The interior surfaces of the shield enclosure 37 define a protective space within which the optics assembly 35 and sensors can be suspended from the chassis 31 (not shown). In the final assembly of the HMD device 20, in which the shield enclosure 37 is attached to the chassis 31 (with the optics assembly and sensors mounted to the chassis 31), the display elements and sensors are contained within a completely sealed enclosure defined by the chassis 31 and the shield enclosure 37. The shield enclosure 37 can be attached to the chassis 31 using any known or convenient bonding method, such as gluing, laser welding, ultrasonic welding, etc.

The shield enclosure 37 (including the front shield 33 and rear shield 32) can be formed of, for example, optical-grade polycarbonate. In at least some embodiments, the front shield 33 and rear shield 32 have thicknesses in the range of approximately 0.8 to 1.2 millimeters. The shield enclosure 37 can be formed as a single part (e.g., by thermal molding), or the front shield 33 and rear shield 32 can be formed as separate pieces (e.g., by thermal molding) that are subsequently bonded together to form the shield enclosure 37. Such bonding (if any) can be, for example, gluing, laser welding, ultrasonic welding, or any other known or convenient bonding technique.

Figure 10A:
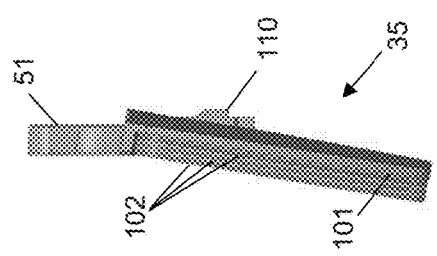
FIGS. 10A, 10B and 10C illustrate right side, front and rear orthogonal views, respectively, of the optics assembly.
Figure 10B:
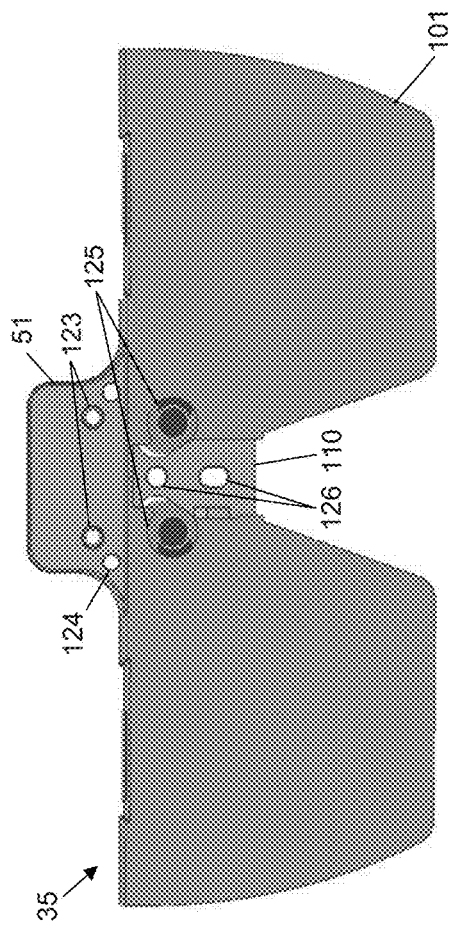
Figure 10C:
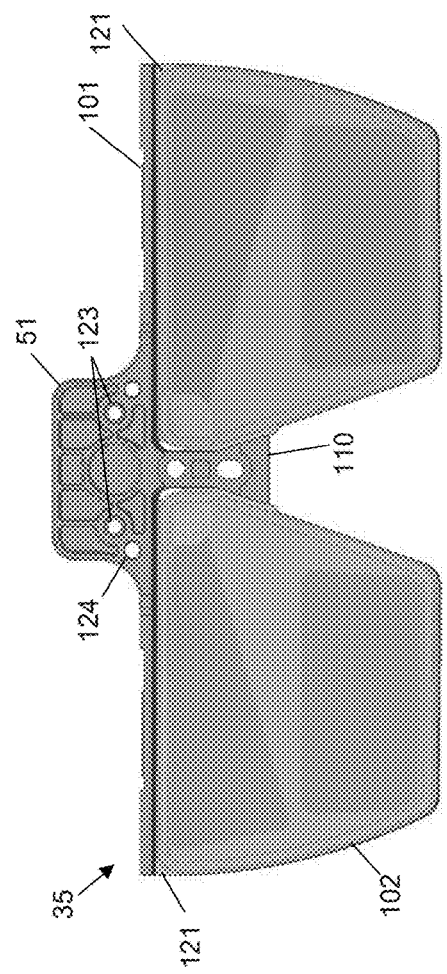
Figure 13B:
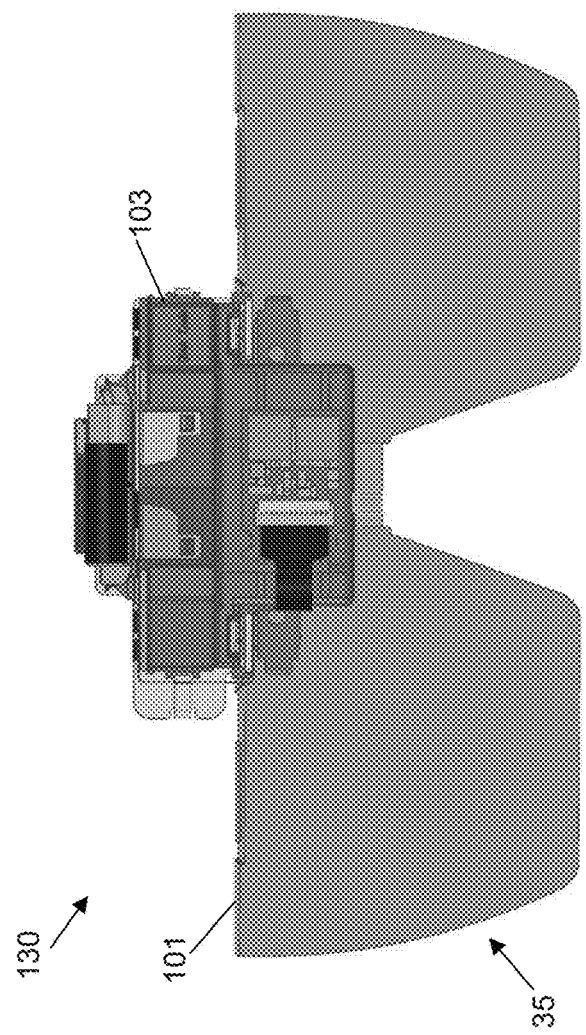
FIGS. 13A and 13B show right side and front orthogonal views of the display assembly.
Figure 13A:
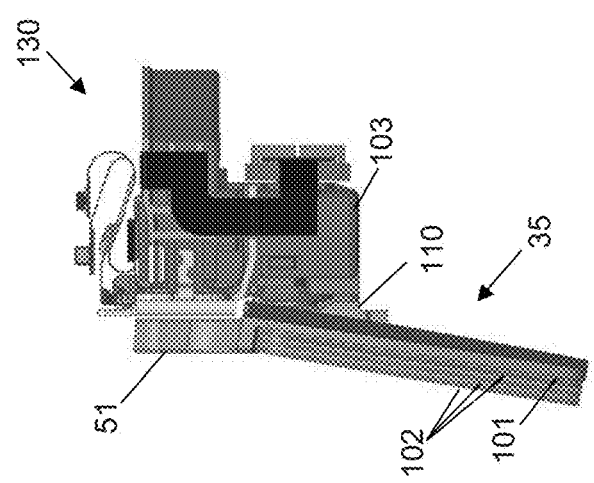

FIGS. 10A, 10B and 10C illustrates right side, front and rear orthogonal views, respectively, of the optics assembly 35. As mentioned, the optics assembly 35 includes the waveguide carrier 101 and multiple waveguides 102. The waveguide carrier 101 is a mounting structure for the waveguides 102 and the display engine 103 (see FIGS. 11 through 13). The waveguides 102 mount onto two flat mounting surfaces 121 of the waveguide carrier 101 (one for the user's left eye and one for the user's right eye) that extend from either side of a central nose bridge section 110 of the carrier 101. In some embodiments, as shown, on each of the left and right mounting surfaces 120, three waveguides 102 are stacked on top of each other, i.e., one waveguide for each of the red, green and blue components of an RGB display, for each eye. Note, however, that other color formats and corresponding waveguide configurations may be used.

As mentioned above, even minor mechanical or thermal stresses applied to the display-related components of the HMD 20 may affect the positioning or alignment of such components and thereby adversely affect functionality of the device. For example a slight misalignment of the left or light light-emission elements or waveguides can cause holographic images to become distorted, adversely affecting their degree of realism and potentially causing physical discomfort to the user. Additionally, misalignment of sensors such as the head-tracking cameras 27 may cause the HMD device 20 to incorrectly compute the user's head position or orientation relative to the user's environment, thereby adversely affecting the quality or realism of the images or sounds presented to the user.

Therefore, in certain embodiments, the display assembly of the HMD device 20 is mounted to the chassis 31 only through a central location that is aligned approximately with a center-point between the user's eyes, with no other points of physical contact, thereby decoupling the display assembly from most mechanical and thermal stresses.

Referring again to FIGS. 10A, 10B and 10C and FIG. 13, the display assembly 130 includes the optics assembly 35 (which includes a waveguide carrier 101 and multiple waveguides 102) and a display engine 103 (see FIGS. 11 through 13). The display engine 103 contains one or more light-emission elements (not shown) for each of the left-eye and right-eye displays. In some embodiments, the light-emission elements are light-emitting diodes (LEDs). During fabrication of the HMD device 20, the display engine 103 is first mounted to the optics assembly 35, by screws or other suitable fasteners, through the center tab 51 of the waveguide carrier 101 (located over the nose bridge region of the optics assembly 35). When so mounted, light emitted by the light-emission elements within the display engine 103 is optically coupled to the waveguides 102, which convey the emitted light toward the user's eyes. Subsequently, the optics assembly 35, with display engine 103 mounted thereto (see FIGS. 13A and 13B), is mounted to the chassis 31, by screws or other suitable fasteners, through the nose bridge region 110 of the waveguide carrier 101. A sensor assembly 111, including the head-tracking cameras 27, IR depth camera 28 and visible-spectrum camera 30, is then mounted to the carrier 31 and display assembly 130.

The optics assembly 35 can be attached to the chassis 31 by one or more screws (or other types of fasteners) through holes 123 in the center tab 51. Alignment holes 124 are used to properly align the waveguide carrier 101 onto the chassis 31 during assembly, prior to fastening of the screws. The display engine 103 (not shown in FIG. 12) mounts to the waveguide carrier 101 by screws (or other suitable fastening mechanism) through corresponding screw holes 126 in the central nose bridge region 110 of the carrier 101 and holes 156 in the display engine 103, as shown in FIGS. 15A and 15B. Left and right optical ports 125 on the waveguide carrier 101 are physically and optically coupled to corresponding optical ports 155 on the display engine 103. The entire display assembly 130 (i.e., optics assembly 35 and display engine 103 mounted to it) is then mounted to the chassis 31 via screws (or other suitable fastening mechanism) through holes 123 in the center tab 51. Notably, this is the only mechanical interface between the entire display assembly 130 and the rest of the HMD 20; the display assembly 130 is coupled to the chassis 31 and suspended within the visor assembly 22 only from this single mounting location on the center tab 51. Similarly, the display engine 103 is mounted to the waveguide carrier 101 only at the central nose bridge region 110 of the waveguide carrier 101.

FIGS. 11 and 12 illustrate the display engine 103 in greater detail. More specifically, FIG. 11 shows a rear perspective view of the display engine 103, while FIGS. 12A, 12B, 12C and 12D show, respectively, front, side, top and rear orthogonal views of the display engine 103. The display engine 103 combines two or more light projectors in one small envelope. The display engine 103 is laterally symmetrical, having identical left and emitter housings 144. The left and right emitter housings 144 each contain one or more light-emission elements (not shown), such as pico projector LEDs. A PCB 141 is mounted on the outside of the display engine 103 and includes one or more motion sensors, such as one or more accelerometers and gyroscopes. Flex circuit 146 on top of the display engine 103 (FIG. 12C) connects the light emission elements (not shown) to a display processor elsewhere in the HMD 20 (e.g., on a PCB mounted to the chassis 31).

To mount the display engine 103 to the waveguide carrier 101, screws (or other suitable mounting mechanism) can be passed through the rear side of the waveguide carrier 101 into corresponding holes 156 in the display engine 103. Left and right optical ports 155 of the display unit 103 physically and optically couple to corresponding optical ports 125 of the waveguide carrier 101. The left and right sides of the display assembly 130 may be very sensitive to distortion due to any physical or thermal stresses. However, the center-mount design of the display engine's interface to the waveguide carrier 101 decouples any external forces from the display engine body, thus keeping left to right alignment intact even if the device is under stress.

Figure 11A:
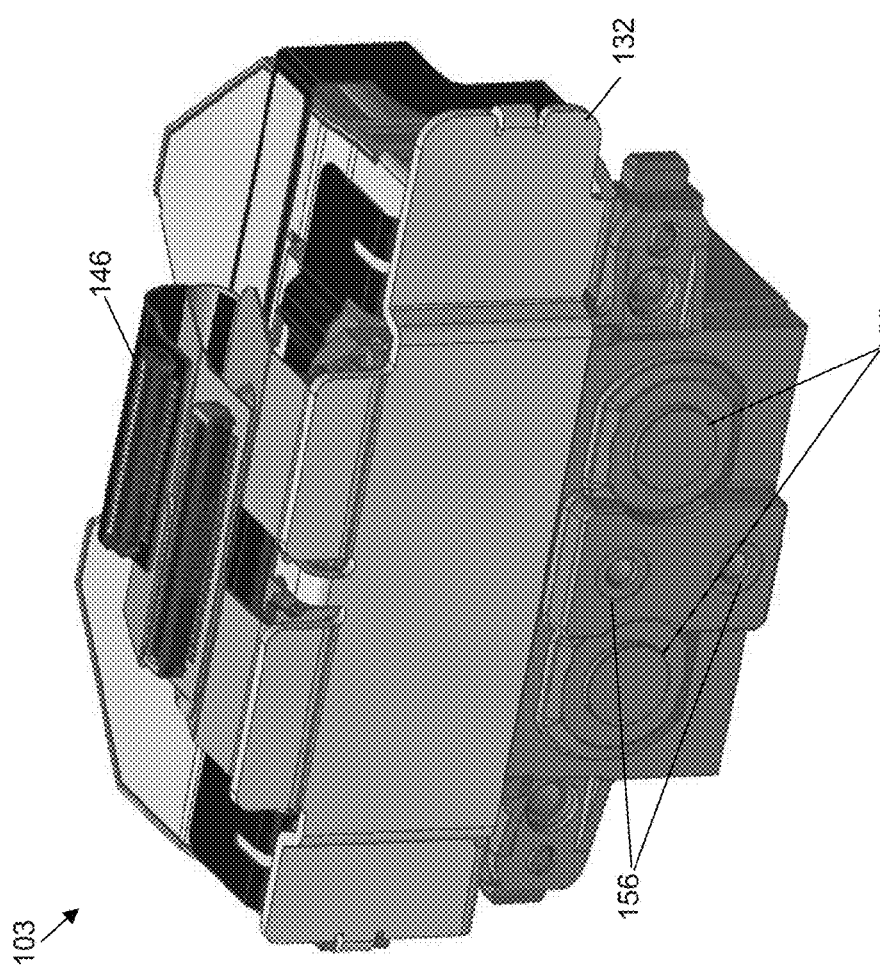
FIG. 11A shows a front perspective view of the display engine.
Figure 11B:
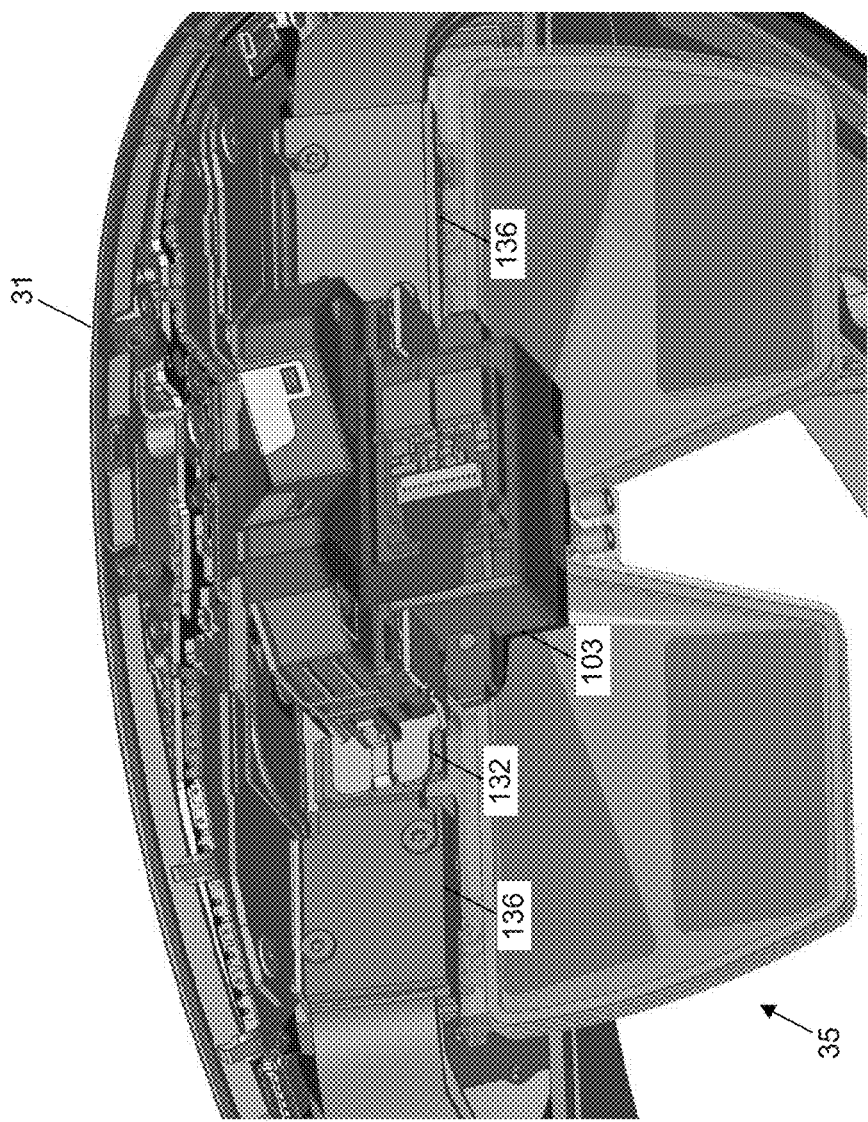
FIG. 11B shows a front perspective view of how the display engine can be mounted in the final assembly.
Figure 12A:
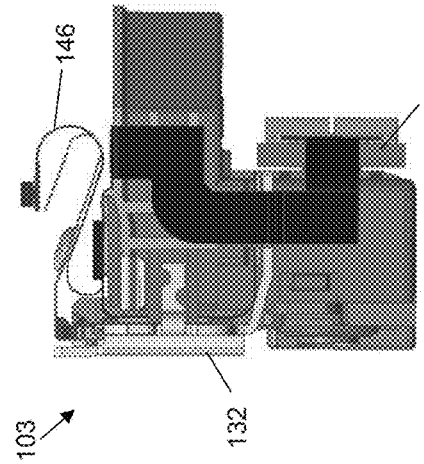
FIGS. 12A, 12B, 12C and 12D show front, side, top and rear orthogonal views, respectively, of the display engine.
Figure 12B:
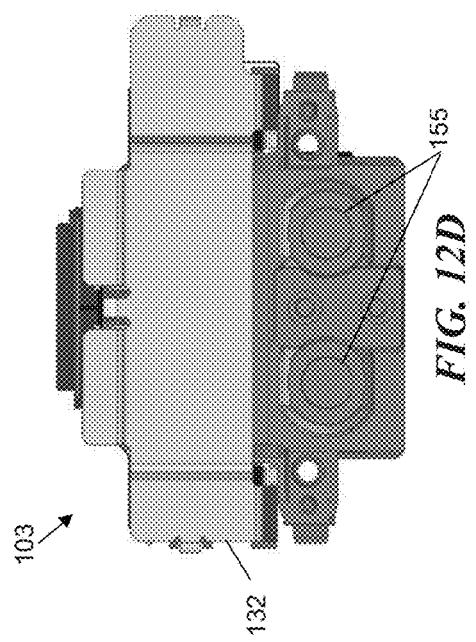
Figure 12C:
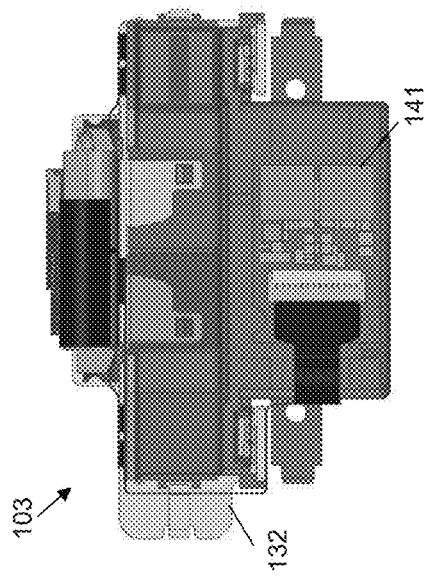
Figure 12D:
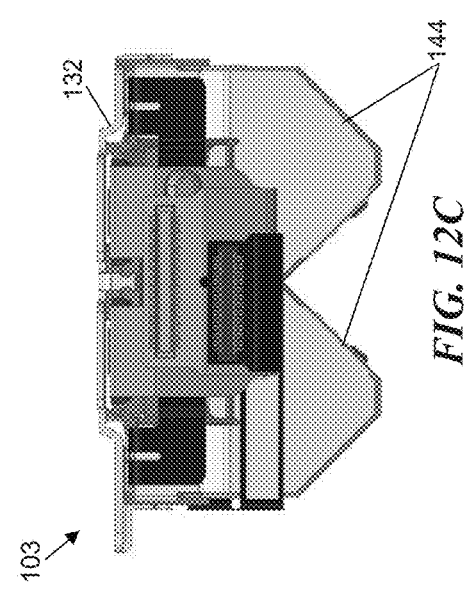

The light-emission elements in display engine 103 may generate a significant amount of heat. Accordingly, in some embodiments, as shown in FIG. 11A, the display engine 103 includes a thermal plate 132, which facilitates transfer of heat away from the display engine 103. Specifically, in the final assembly of the HMD 20, as shown in FIG. 11B, the left end and/or right end of thermal plate 132 may lie against one of two other thermal plates 136 that are mounted to the chassis 31 (one on each side of thermal plate 132) and that form part of an overall heat transfer system designed to convey heat away from the display engine 103 and the electronics. A thin layer of compliant thermally conductive material may be sandwiched between plate 132 and one or both of plates 136. This approach helps to reduce thermal stress on the display engine 103 and optics assembly 35.

Figure 14A:
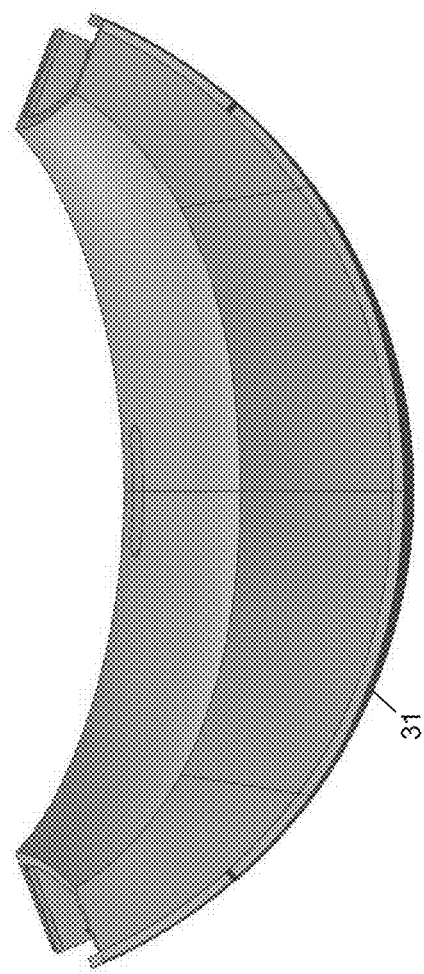
FIGS. 14A, 14B and 14C show top, right side and front orthogonal views of the chassis.
Figure 14C:
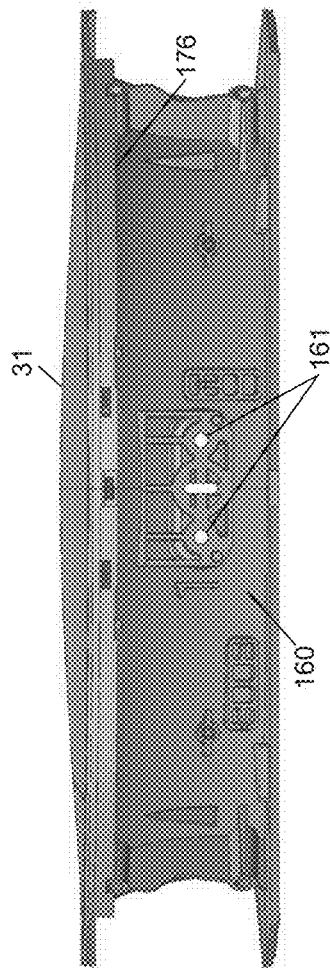
Figure 14B:
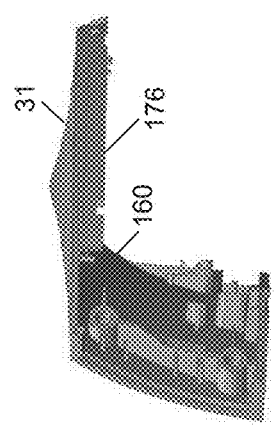
Figure 15:
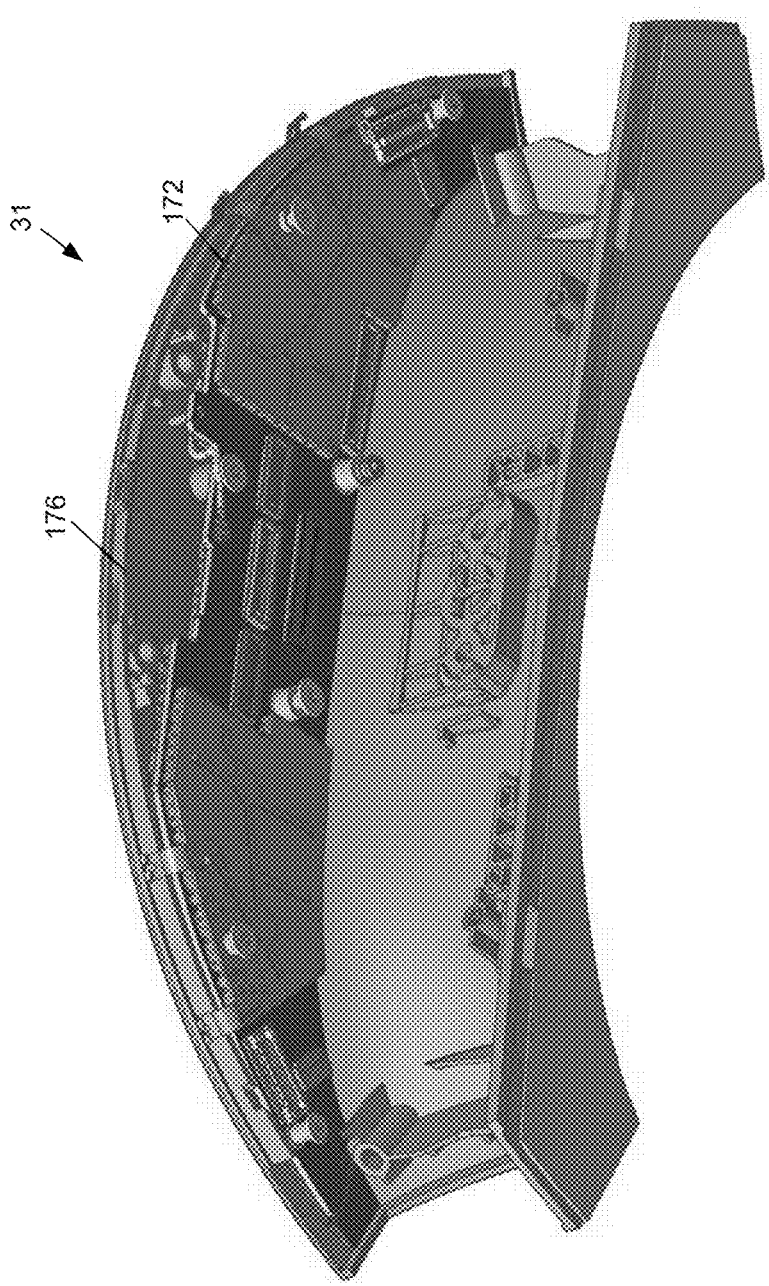
FIG. 15 shows a front perspective view of the chassis, with a printed circuit board (PCB) mounted to it.

The chassis 31 is the structural component by which all of the display elements, optics, sensors and electronics are coupled to the rest of the HMD device 20. FIGS. 14A, 14B and 14C show, respectively, top, front and right-side views of the chassis 31, while FIG. 15 shows a perspective view of the chassis 31. The chassis can be formed of molded plastic or polymer, for example. The front surface 160 of the chassis 31 may include various fixtures (e.g., screw holes, raised flat surfaces, etc.) to which the sensor assembly (not shown) can be attached. For example, the chassis 31 has screw holes (or other similar mounting fixtures) 161 by which the optics assembly 35 can be attached to the chassis 31. The chassis 31 further has one or more fixtures by which at least one printed circuit board (PCB) 172 bearing the electronics components of the HMD 20 can be mounted, as shown in FIG. 15. An example of such a PCB is illustrated in FIG. 15, which shows a front perspective view of the chassis 31 with a PCB 172 mounted to a top inner surface 176 of the chassis 31 (see FIGS. 14A, 14B and 14C).

FIGS. 16A and 16B further illustrate how the optics assembly 35 (including waveguide carrier 101 and waveguide 102) can mount to the chassis 31. Specifically, FIG. 16B shows the front view while FIG. 16A shows the right side view of these components. Note, however, that during assembly of the HMD device 20, according to at least some embodiments the waveguide carrier 101 is mounted to the chassis 31 only after the display engine 103 has been mounted to the waveguide carrier 101; however, the display engine 103 is not shown in FIGS. 16A and 16B to facilitate illustration a how the waveguide carrier 101 is mounted to the chassis 31.

Figure 17:
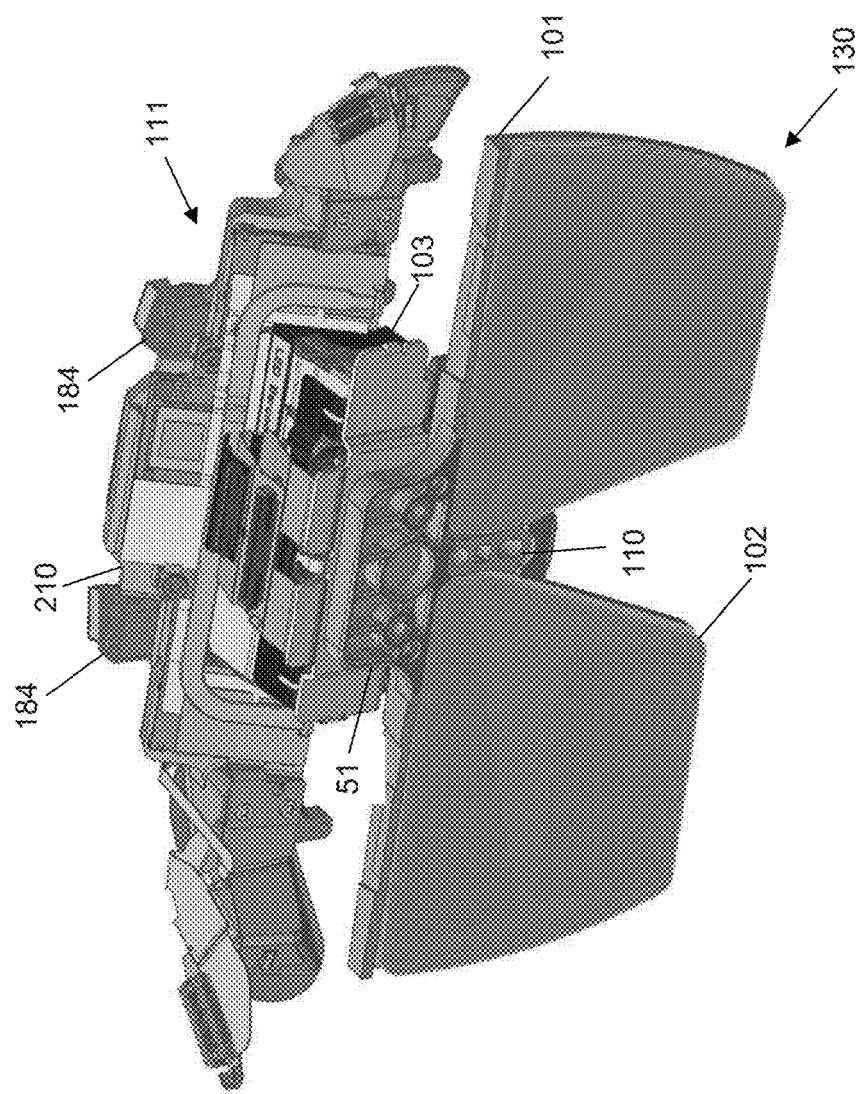
FIG. 17 shows a rear perspective view of the display assembly and sensor assembly coupled to each other.
Figure 18A:
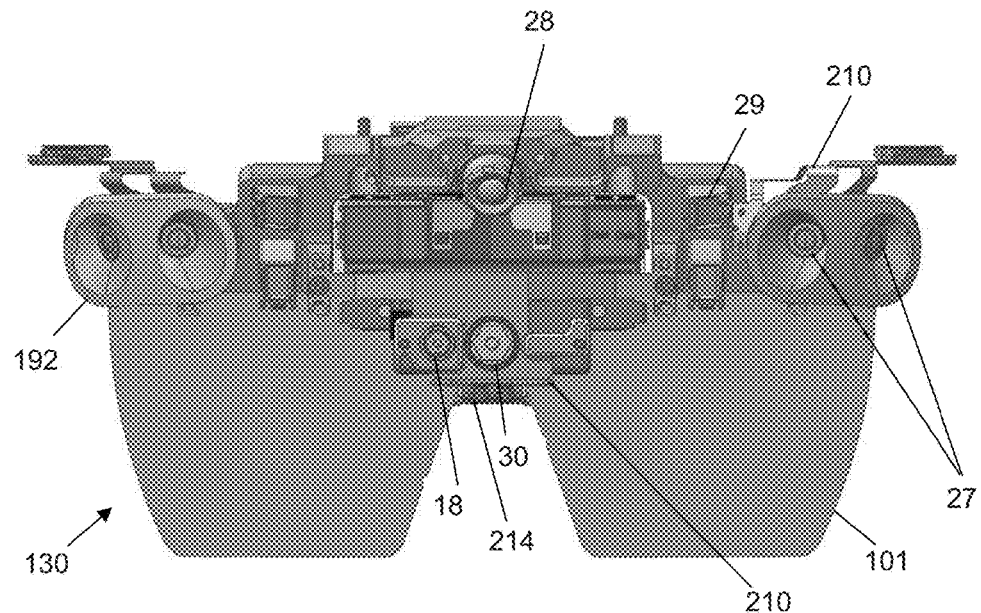
FIGS. 18A through 18D, show front, rear side and bottom orthogonal views, respectively, of the combined display assembly and sensor assembly.
Figure 18B:
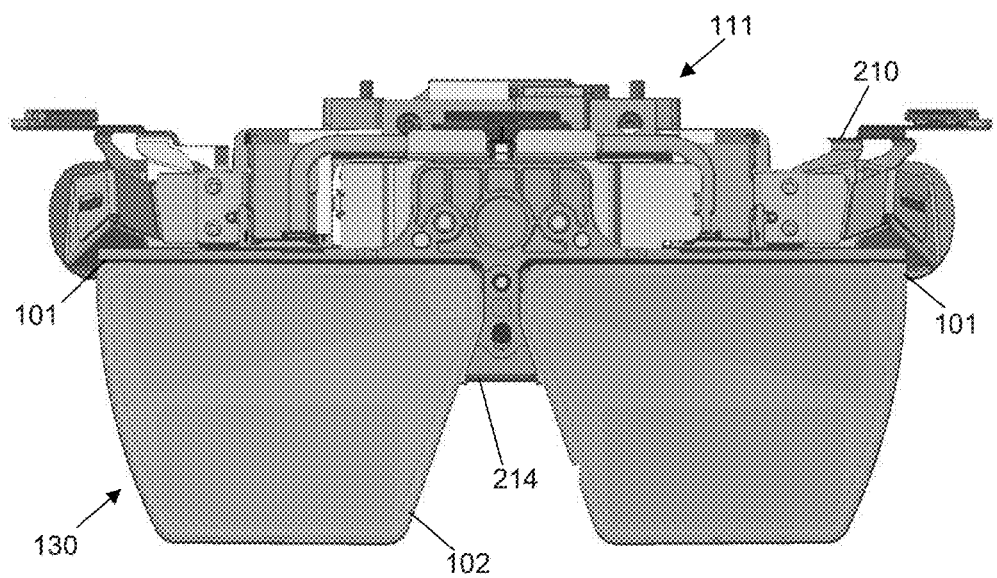
Figure 18C:
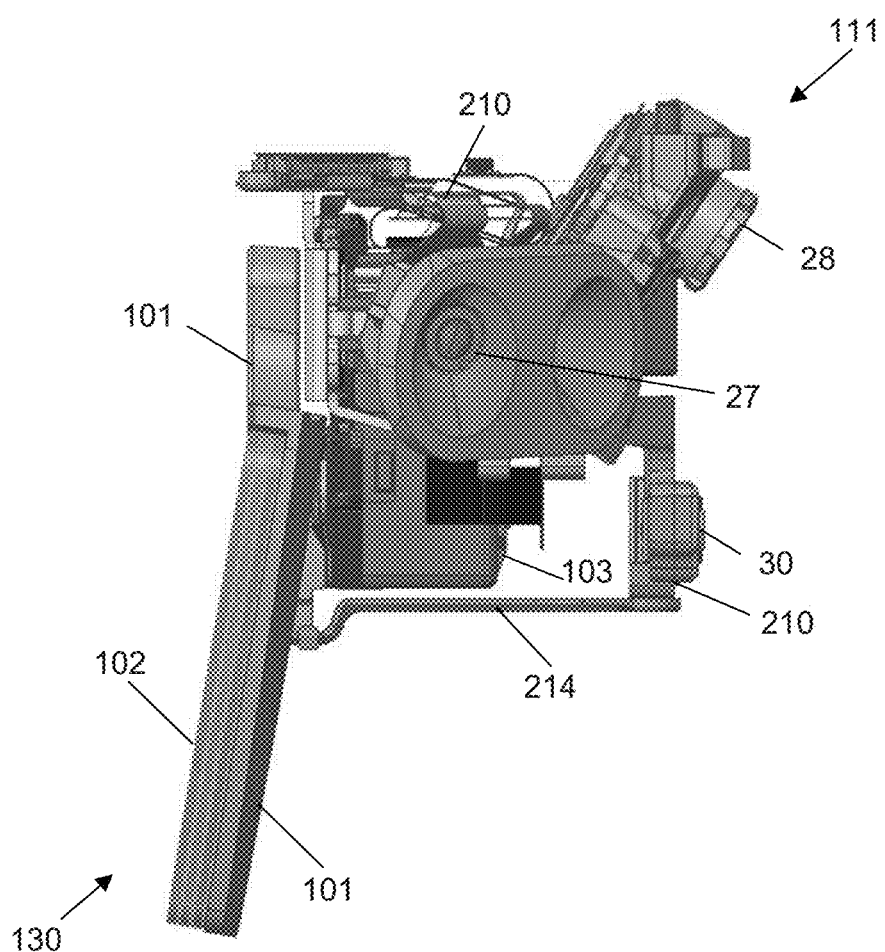
Figure 18D:
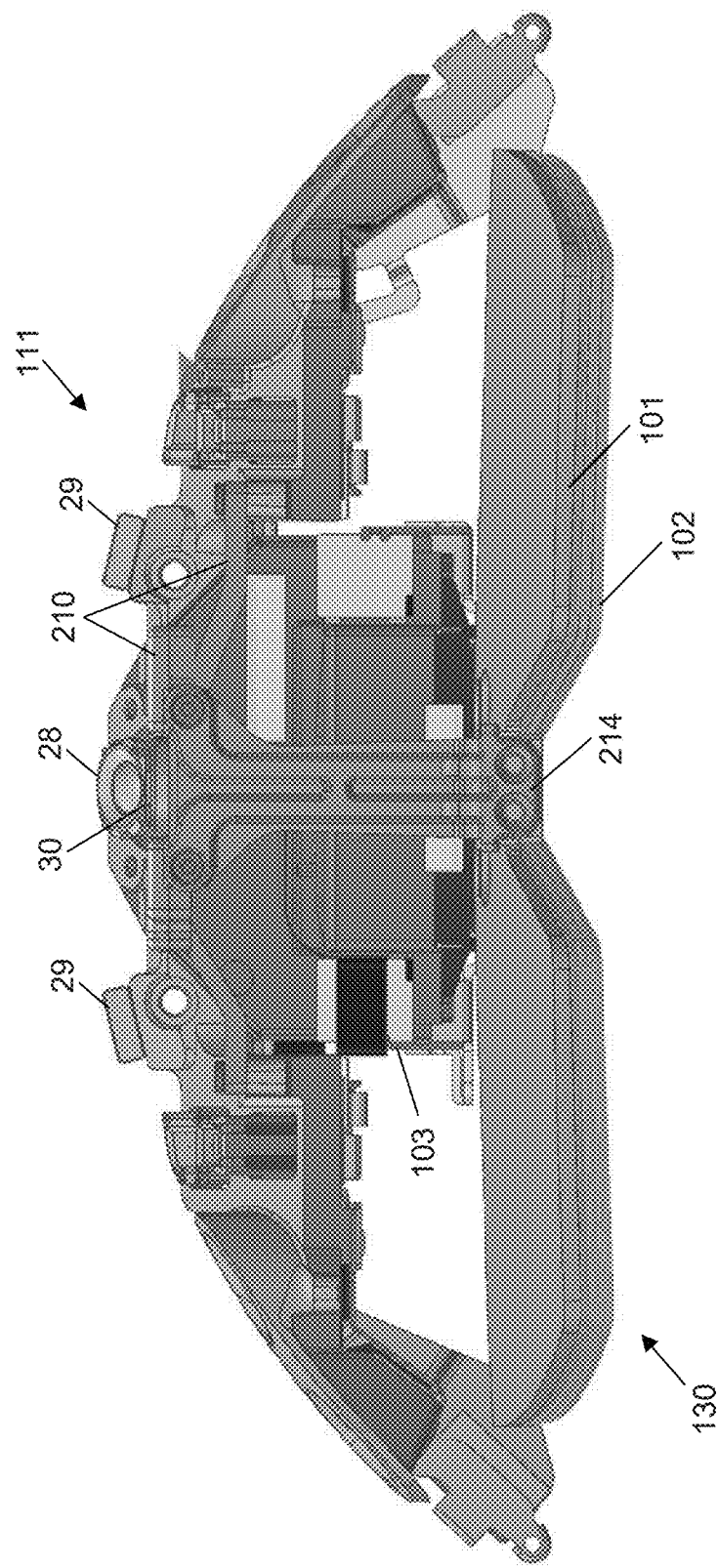
Figure 19:
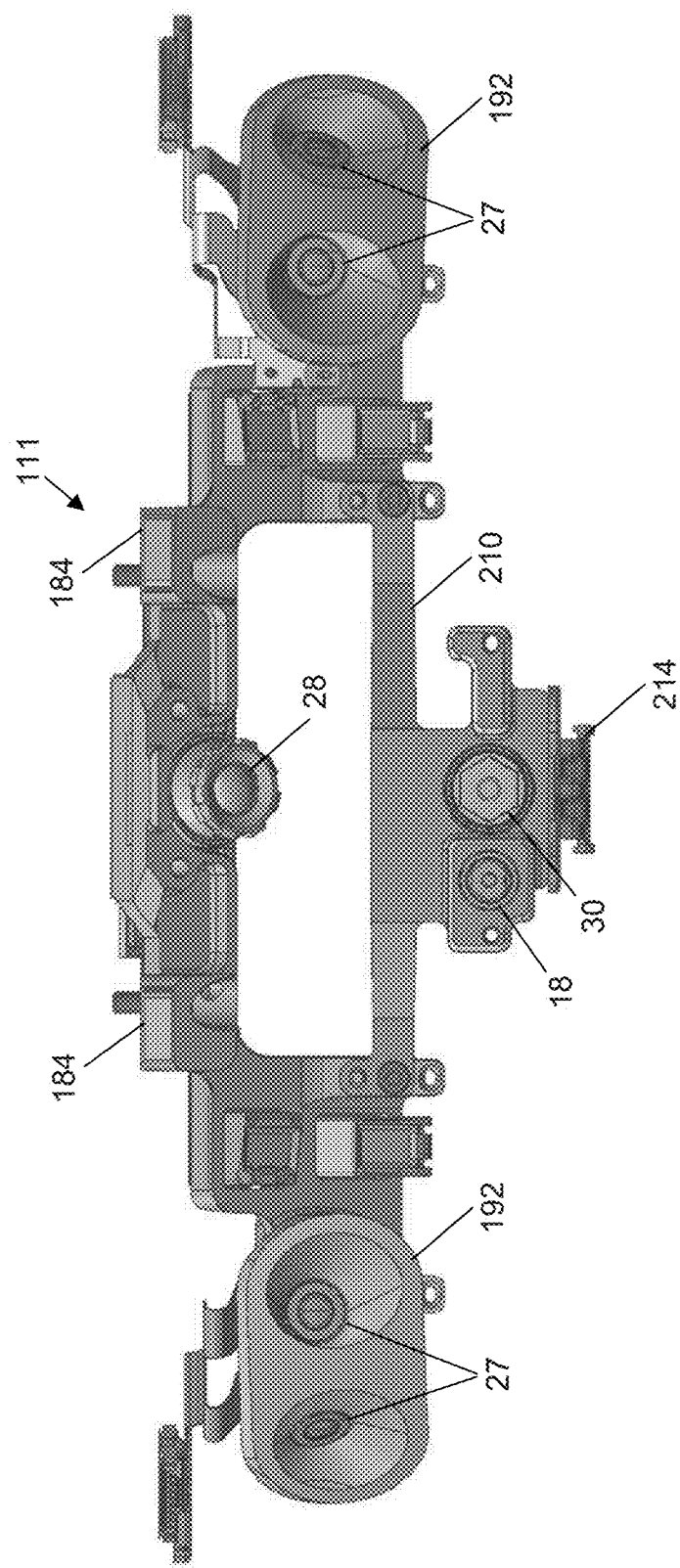
FIG. 19 shows the front view of the sensor assembly.

Referring now to FIG. 17, the HMD device 20 also includes a sensor assembly 111, which includes a sensor frame 210, and various sensors (e.g., head-tracking cameras 27, IR depth camera 28, visible-spectrum camera 30, and ambient light sensor (ALS) 18) and IR light sources 29, some or all of which may be mounted to the sensor frame 210. FIG. 17 shows a rear perspective view of the display assembly 130 (including optics assembly 35 and display engine 103) and sensor assembly 111, coupled to each other. The sensor frame 210 is preferably made of a material that is lightweight, structurally stable and strong, which in some embodiments may be metal. The sensor frame 210 may be formed of a single part, or multiple pieces connected to each other. The sensor frame 210 attaches to the top inner surface 176 of the chassis 31 (see FIGS. 14A, 14B and 14C) via two mounting points 184 on the sensor frame 210, for example, by screws or other fastening mechanism. Hence, the combined sensor assembly 111 and display assembly 130 mount to the chassis 31 through only three points: the center tab 51 of the waveguide carrier 101 and the two mounting points 184 on the sensor frame. FIGS. 18A through 18D, show front, rear side and bottom orthogonal views, respectively, of the combined display assembly and sensor assembly. FIG. 19 shows the front view of the sensor assembly 111, i.e., the sensor frame 210 with the various sensors mounted to it. FIGS. 20A, 20B and 20C show, respectively, the right side, front and bottom orthogonal views of the sensor frame 210 and anti-reflection shields 192, i.e., without the sensors.

Figure 21:
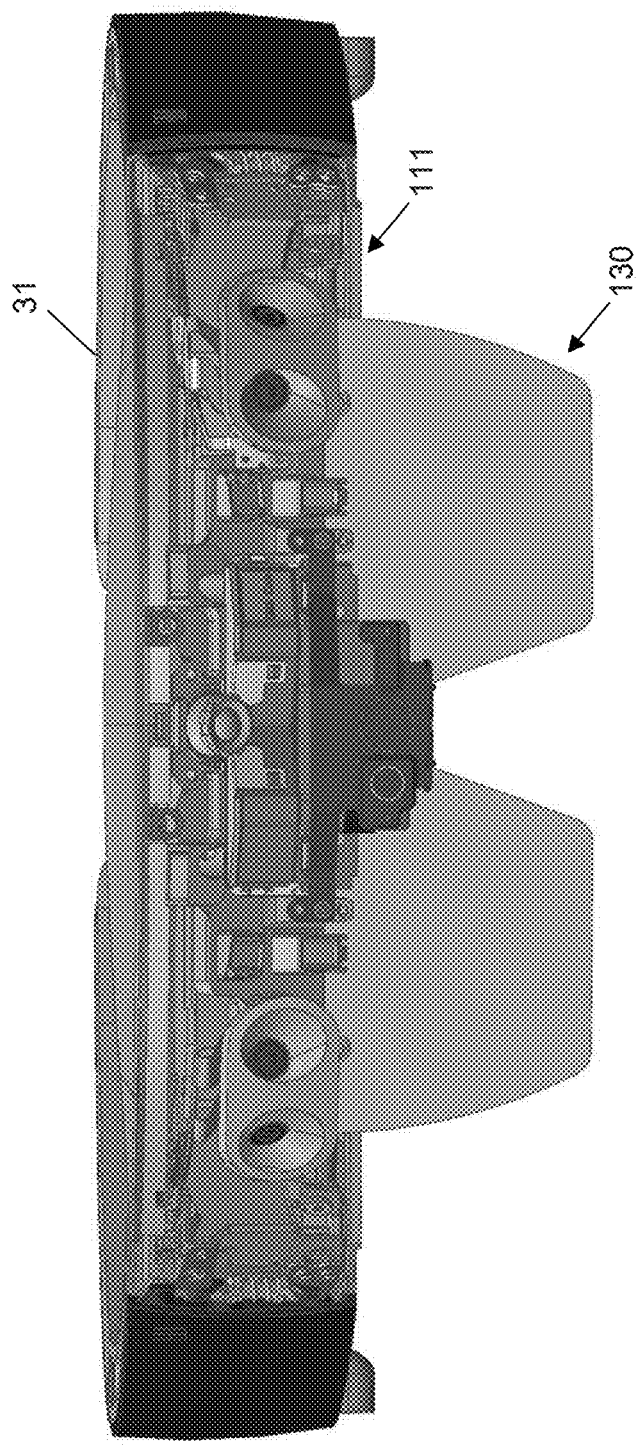
FIG. 21 shows a front view of the combination of the display assembly and sensor assembly mounted to the chassis
Figure 22:
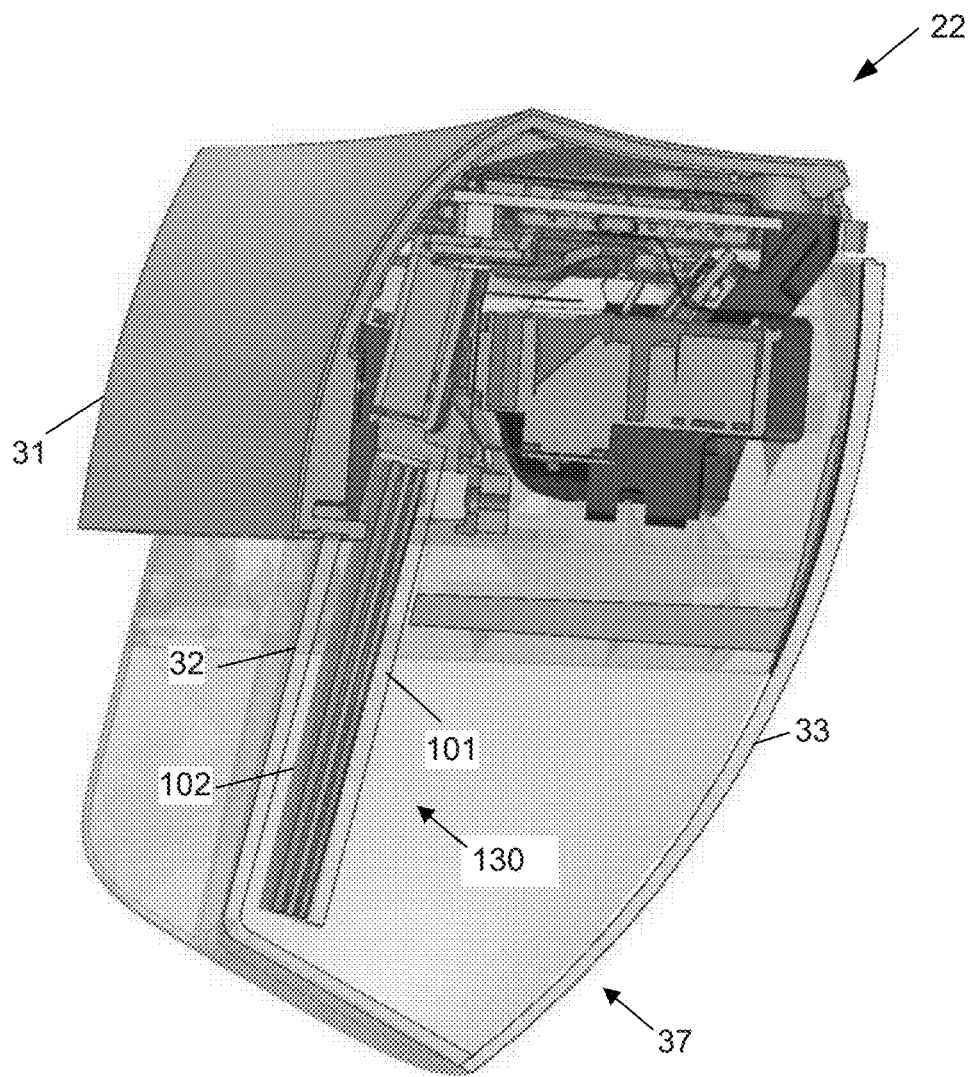
FIG. 22 shows a right side view of the visor assembly.

FIG. 21 shows a front view of the combination of the display assembly 130 and sensor assembly 111 mounted to the chassis 31. FIG. 22 shows a right side view of the visor assembly 22, in which the integrated display and sensor assemblies are mounted to the chassis 31 and suspended within the shield enclosure 37. The display assembly 130 is suspended from the chassis 31 so that the waveguides 102 and waveguide carrier 101 do not touch the shield enclosure 37 or any other component. Note that the rear shield 32 of the shield enclosure 37 is curved (as is the front shield 33), such that there may actually be more clearance between the waveguides 102 and the inner surface of the rear shield 32 than appears in FIG. 25.

Any or all of the features and functions described above can be combined with each other, except to the extent it may be otherwise stated above or to the extent that any such embodiments may be incompatible by virtue of their function or structure, as will be apparent to persons of ordinary skill in the art. Unless contrary to physical possibility, it is envisioned that (i) the methods/steps described herein may be performed in any sequence and/or in any combination, and that (ii) the components of respective embodiments may be combined in any manner.

EXAMPLES OF CERTAIN EMBODIMENTS

Certain embodiments of the technology introduced herein are summarized in the following numbered examples:

1. A display device comprising: a head fitting by which the display device can be worn on the head of a user; and a visor assembly mounted to the head fitting, the visor assembly including a plurality of display elements arranged to be aligned with the eyes of the user when the display device is worn by the user; a plurality of sensors; and a protective enclosure enclosing the display elements and the sensors, the enclosure including an upper portion aligned with the sensors and a lower portion aligned with the display elements, the upper portion being substantially opaque to visible light and transparent to infrared light, the lower portion having a variable tinting scheme in which at least some of the lower portion of the enclosure is transparent to visible light.

2. A display device as recited in example 1, wherein a degree of transparency to visible light of the lower portion increases from top to bottom of the lower portion of the enclosure.

3. A display device as recited in example 1 or 2, wherein the plurality of sensors include an infrared camera and a visible-spectrum camera.

4. A display device as recited in example 3, the upper portion having a window that is transparent to visible light, aligned with the visible-spectrum camera.

5. A display device as recited in example 3 or 4, wherein the infrared camera is configured for use in acquiring depth measurements based on time-of-flight, and wherein the visible-spectrum camera is configured for use in performing head tracking of the user.

6. A display device as recited in any of examples 1 through 5, wherein the plurality of display elements comprises a plurality of waveguides that are transparent to visible light.

7. A display device as recited in any of examples 1 through 6, further comprising a chassis coupled to the head fitting, wherein the display elements and the sensors are coupled to the chassis.

8. A visor assembly for a head-mounted display device, the visor assembly comprising: a plurality of display elements arranged to be aligned with the eyes of a user when the head-mounted display device is worn by the user; a plurality of sensors; and a protective enclosure enclosing the display elements and the sensors, the enclosure including an upper portion aligned with the sensors and a lower portion aligned with the display elements, the upper portion being substantially opaque to visible light, the lower portion having a variable tinting scheme in which at least some of the lower portion of the enclosure is transparent to visible light.

9. A visor assembly as recited in example 8, wherein a degree of transparency to visible light of the lower portion increases from top to bottom of the lower portion of the enclosure.

10. A visor assembly as recited in example 8 or 9, wherein the plurality of sensors include an infrared camera and a visible-spectrum camera.

11. A visor assembly as recited in example 10, wherein the upper portion is transparent to infrared light, the upper portion having a window that is transparent to visible light, aligned with the visible-spectrum camera.

12. A visor assembly as recited in example 10 or 11, wherein the infrared camera is configured for use in acquiring depth measurements based on time-of-flight, and wherein the visible-spectrum camera is configured for use in performing head tracking of the user.

13. A visor assembly as recited in any of examples 8 through 12, wherein the display elements are transparent to visible light.

14. A visor assembly as recited in any of examples 8 through 13, further comprising a chassis coupled to the head fitting, wherein the display elements and the sensors are coupled to the chassis.

15. A display device comprising: a head fitting by which the display device can be worn on the head of a user; a chassis coupled to the head fitting; a display assembly mounted to the chassis and including a plurality of waveguides arranged to project light into the eyes of the user when the display device is worn by the user, the waveguides being transparent to visible light; a sensor assembly mounted to the chassis, the sensor assembly including an infrared camera and a plurality of visible-spectrum cameras; and a protective enclosure coupled to the chassis and enclosing the display assembly and the sensor assembly, the enclosure including an upper portion vertically aligned with the sensor assembly and a lower portion vertically aligned with the plurality of waveguides, the upper portion having a substantially uniform tinting scheme such that the upper portion is substantially opaque to visible light and transparent to infrared light, the first tinting scheme having a plurality of windows defined therein that are transparent to visible light, each of the windows aligned with at least one of the visible-spectrum cameras, the lower portion having a vertically graded tinting scheme such that a degree of transparency to visible light of the lower portion increases from top to bottom of the lower portion of the enclosure, such that at least some of the lower portion is transparent to visible light.

16. A display device as recited in example 15, wherein the infrared camera is configured for use in acquiring depth measurements based on time-of-flight, and wherein the plurality of visible-spectrum cameras are configured for use in performing head tracking of the user.

Any or all of the features and functions described above can be combined with each other, except to the extent it may be otherwise stated above or to the extent that any such embodiments may be incompatible by virtue of their function or structure, as will be apparent to persons of ordinary skill in the art. Unless contrary to physical possibility, it is envisioned that (i) the methods/steps described herein may be performed in any sequence and/or in any combination, and that (ii) the components of respective embodiments may be combined in any manner.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

What is claimed is:

1. A display device comprising:
   a head fitting by which the display device can be worn on the head of a user; and
   a visor assembly mounted to the head fitting, the visor assembly including
      a plurality of display elements arranged to be aligned with the eyes of the user when the display device is worn by the user;
      a plurality of sensors; and
      a protective enclosure enclosing the display elements and the sensors, the enclosure including an upper portion aligned with the sensors and a lower portion aligned with the display elements, the upper portion being substantially opaque to visible light and transparent to infrared light, the lower portion having a non-uniform tinting scheme in which at least some of the lower portion of the enclosure is transparent to visible light.

2. A display device as recited in claim 1, wherein a degree of transparency to visible light of the lower portion increases from top to bottom of the lower portion of the enclosure.

3. A display device as recited in claim 1, wherein the plurality of sensors include an infrared camera and a visible-spectrum camera.

4. A display device as recited in claim 3, the upper portion having a window that is transparent to visible light, aligned with the visible-spectrum camera.

5. A display device as recited in claim 4, wherein the infrared camera is configured for use in acquiring depth measurements based on time-of-flight, and wherein the visible-spectrum camera is configured for use in performing head tracking of the user.

6. A display device as recited in claim 1, wherein the plurality of display elements comprises a plurality of waveguides that are transparent to visible light.

7. A display device as recited in claim 1, further comprising a chassis coupled to the head fitting, wherein the display elements and the sensors are coupled to the chassis.

8. A display device as recited in claim 1, wherein the tinting scheme of the lower portion of the enclosure varies spatially.

9. A visor assembly for a head-mounted display device, the visor assembly comprising:
   a plurality of display elements arranged to be aligned with the eyes of a user when the head-mounted display device is worn by the user;
   a plurality of sensors; and
   a protective enclosure enclosing the display elements and the sensors, the enclosure including an upper portion aligned with the sensors and a lower portion aligned with the display elements, the upper portion being substantially opaque to visible light, the lower portion having a non-uniform tinting scheme in which at least some of the lower portion of the enclosure is transparent to visible light.

10. A visor assembly as recited in claim 9, wherein a degree of transparency to visible light of the lower portion increases from top to bottom of the lower portion of the enclosure.

11. A visor assembly as recited in claim 9, wherein the plurality of sensors include an infrared camera and a visible-spectrum camera.

12. A visor assembly as recited in claim 11, wherein the upper portion is transparent to infrared light, the upper portion having a window that is transparent to visible light, aligned with the visible-spectrum camera.

13. A visor assembly as recited in claim 12, wherein the infrared camera is configured for use in acquiring depth measurements based on time-of-flight, and wherein the visible-spectrum camera is configured for use in performing head tracking of the user.

14. A visor assembly as recited in claim 9, wherein the display elements are transparent to visible light.

15. A visor assembly as recited in claim 9, further comprising a chassis coupled to the head fitting, wherein the display elements and the sensors are coupled to the chassis.

16. A visor assembly as recited in claim 9, wherein the tinting scheme of the lower portion of the enclosure varies spatially.

17. A display device comprising:
   a head fitting by which the display device can be worn on the head of a user;
   a chassis coupled to the head fitting;
   a display assembly mounted to the chassis and including a plurality of waveguides arranged to project light into the eyes of the user when the display device is worn by the user, the waveguides being transparent to visible light;
   a sensor assembly mounted to the chassis, the sensor assembly including an infrared camera and a plurality of visible-spectrum cameras; and
   a protective enclosure coupled to the chassis and enclosing the display assembly and the sensor assembly, the enclosure including an upper portion vertically aligned with the sensor assembly and a lower portion vertically aligned with the plurality of waveguides, the upper portion having a substantially uniform tinting scheme such that the upper portion is substantially opaque to visible light and transparent to infrared light, the first tinting scheme having a plurality of windows defined therein that are transparent to visible light, each of the windows aligned with at least one of the visible-spectrum cameras, the lower portion having a vertically graded tinting scheme such that a degree of transparency to visible light of the lower portion increases from top to bottom of the lower portion of the enclosure, such that at least some of the lower portion is transparent to visible light.

18. A display device as recited in claim 17, wherein the infrared camera is configured for use in acquiring depth measurements based on time-of-flight, and wherein the plurality of visible-spectrum cameras are configured for use in performing head tracking of the user.

\* \* \* \* \*